(12) United States Patent
Onno et al.

(10) Patent No.: US 7,215,819 B2
(45) Date of Patent: May 8, 2007

(54) METHOD AND DEVICE FOR PROCESSING AN ENCODED DIGITAL SIGNAL

(75) Inventors: Patrice Onno, Rennes (FR); Fabrice Le Laennec, Cesson Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 851 days.

(21) Appl. No.: 10/180,041

(22) Filed: Jun. 27, 2002

(65) Prior Publication Data

US 2003/0018750 A1    Jan. 23, 2003

(30) Foreign Application Priority Data

Jun. 27, 2001    (FR) .................................. 01 08479

(51) Int. Cl.
  *G06K 9/36* (2006.01)
  *G06K 9/46* (2006.01)

(52) U.S. Cl. .................... 382/240; 348/14.12; 358/443; 382/233; 382/244; 382/248; 382/251; 375/240.11; 375/240.19

(58) Field of Classification Search ................. 381/104, 381/107; 382/173, 190, 232, 233, 240; 700/94; 348/14.12; 358/443; 375/240.11, 375/240.19
See application file for complete search history.

(56) References Cited

U.S. PATENT DOCUMENTS

| | | | | |
|---|---|---|---|---|
| 5,287,203 A | * | 2/1994 | Namizuka | ................... 358/443 |
| 5,365,231 A | * | 11/1994 | Niimura | ...................... 341/58 |
| 5,896,502 A | | 4/1999 | Shieh et al. | ........... 395/200.54 |
| 6,205,286 B1 | * | 3/2001 | Nishimura et al. | ......... 386/107 |
| 6,377,862 B1 | * | 4/2002 | Naruki et al. | ................. 700/94 |
| 6,498,625 B1 | * | 12/2002 | Yamamoto et al. | ...... 348/384.1 |
| 6,501,860 B1 | | 12/2002 | Charrier et al. | ............. 382/240 |
| 6,507,611 B1 | * | 1/2003 | Imai et al. | ................... 375/222 |
| 6,560,497 B2 | * | 5/2003 | Naruki et al. | ................. 700/94 |
| 6,956,974 B1 | * | 10/2005 | Ito et al. | ..................... 382/240 |
| 2002/0048319 A1 | | 4/2002 | Onno | ......................... 375/240 |
| 2002/0051583 A1 | | 5/2002 | Brown et al. | ............... 382/299 |

(Continued)

FOREIGN PATENT DOCUMENTS

WO    WO 9730551    8/1997

(Continued)

OTHER PUBLICATIONS

S. Dechpande, et al., "HTTP Streaming Of JPEG2000 Images", Proceedings International Conference on Information Technology: Coding and Computing, Apr. 2, 2001, pp. 15-19, XP002193324.

(Continued)

*Primary Examiner*—Gregory Desire
(74) *Attorney, Agent, or Firm*—Fitzpatrick, Cella, Harper & Scinto

(57) ABSTRACT

A method of processing an encoded digital signal comprising a set of data obtained by encoding a set of original data representing physical quantities, and a set of information representing the original data and parameters used during the encoding. The method includes receiving an initial request for obtaining a selected part of the digital signal, determining at least one quantity of data representing the selected part of the digital signal as a function of the set of information and of the initial request, and providing at least one value of this determined quantity of data.

49 Claims, 14 Drawing Sheets

U.S. PATENT DOCUMENTS

| | | | |
|---|---|---|---|
| 2002/0191852 A1 | 12/2002 | Le Leannec et al. | 382/233 |
| 2003/0018750 A1* | 1/2003 | Onno et al. | 709/219 |
| 2003/0128878 A1 | 7/2003 | Leannec et al. | 382/233 |
| 2003/0174897 A1 | 9/2003 | Le Leannec et al. | 382/240 |

FOREIGN PATENT DOCUMENTS

| | | |
|---|---|---|
| WO | WO 0065838 | 11/2000 |

OTHER PUBLICATIONS

T. Boudier et al., "VIDOS, a System For Video Editing And Format Conversion Over The Internet", Computer Networks, Elsevier Science Publishers B.V., Amsterdam, NL, vol. 34, No. 6, Dec. 2000, pp. 931-944, XP004304831.

R. Blumberg, et al., "Visual Realism And Interactivity For The Internet", Proceedings of IEEE Compcon '97, San Jose, Feb. 1997, Los Alamitos, IEEE, Comp. Soc. Press, US, pp. 269-273, XP000751797.

* cited by examiner

| Tile Layer | Quality layer 0 | Quality layer 1 | Quality layer 2 | Quality layer 3 | Quality layer 4 |
|---|---|---|---|---|---|
| T2 | 100 bits | 100 bits | 200 bits | 10 bits | 300 bits |
| T3 | 400 bits | 400 bits | 300 bits | 400 bits | 1200 bits |
| T4 | 300 bits | 300 bits | 400 bits | 200 bits | 900 bits |
| T7 | 500 bits | 500 bits | 600 bits | 600 bits | 1500 bits |
| T8 | 2000 bits | 2000 bits | 2500 bits | 1000 bits | 6000 bits |
| T9 | 1500 bits | 1500 bits | 2000 bits | 2500 bits | 5000 bits |
| T12 | 100 bits | 100 bits | 200 bits | 300 bits | 300 bits |
| T13 | 1500 bits | 1500 bits | 1500 bits | 3500 bits | 4500 bits |
| T14 | 1000 bits | 1000 bits | 1000 bits | 2000 bits | 4000 bits |
| Amount | 6500 bits | 7400 bits | 8500 bits | 10510 bits | 23700 bits |
| Cumulative amount | 6500 bits | 13900 bits | 22400 bits | 32910 bits | 56610 bits |
| Percentage/total | 11,5% | 24,5% | 39,5% | 58,1% | 100% |

*Fig. 9*

METHOD AND DEVICE FOR PROCESSING AN ENCODED DIGITAL SIGNAL

The present invention concerns a method of processing an encoded digital signal comprising, on the one hand, a set of data obtained by encoding a set of original data representing physical quantities, and on the other hand, a set of parameters representing original data and parameters used during the encoding.

The invention applies in particular to the field of image processing.

In the context of part 1 of the JPEG2000 standard entitled "JPEG2000 Image Coding System", the structure of the internal data is such that a user can have access to part of an encoded image, referred to as a sub-image, without having to decode the entire image.

This is advantageous insofar as the user obtains the desired sub-image more rapidly than if he had to decode the entire image.

A method is known which provides for a prior processing for carrying out the above function. An image format known as "flashpix" is used, which contains a series of images in accordance with the JPEG standard and with a fixed size of 64×64. To obtain a part of the image or sub-image in the flashpix format, the method consists of decoding the different small images of size 64×64 in order to obtain the sub-image.

The decoding of a sub-image is made possible because of the structure of the data or samples constituting the encoded image and which are organized in blocks, each block constituting a basic unit for the encoding of the image.

Because of this, it is possible to access the sub-image selected by the user more rapidly by extracting and decoding only the basic blocks corresponding to this sub-image.

To do this, first of all the sub-image is projected into the different frequency sub-bands which are obtained by decomposing the image into frequency sub-bands according to one or more decomposition levels. Next, in the different sub-bands, the basic blocks in which the sub-image is to be found are identified and are decoded in order to reconstitute the sub-image.

The applicant has realized that when the user sends out an initial request for obtaining a selected sub-image addressed, for example, to a server, he generally has no indication about the data making up that sub-image nor, for example, on the level of quality available for the sub-image, or about the quantity of data making up the sub-image.

Thus, on sending out a request, the user is unable to know with precision the content of the response which will be made to his request.

For example, by receiving the entire quantity of data making up the sub-image, it is possible that this quantity exceeds the storage capacity of the user's computer equipment.

However, the user only realizes this on reception of these data and will then be obliged to send out a new request by selecting a sub-image of reduced size.

It is also possible that the quantity of data making up the sub-image makes the transmission time of that quantity of data from the server to the user's computer equipment prohibitive for him.

Generally, the applicant has noted that the selection method of a sub-image described above does not make it possible to adapt to the constraints and/or requirements specific to the user.

The applicant has also observed that this problem could be generalized to the case of a digital encoded signal which is not necessarily an encoded image.

Such a digital signal can for example be a sound signal.

The invention makes it possible to remedy at least one of the above drawbacks by providing a new method and device for processing an encoded digital signal making it possible to take into account the constraints and/or requirements specific to a user sending a request for obtaining a part of the digital signal.

According to a first aspect, the subject of the present invention is thus a method of processing an encoded digital signal comprising, on the one hand, a set of data obtained by encoding a set of original data representing physical quantities, and on the other hand, a set of parameters representing original data and parameters used during the encoding, said method comprising the following steps:

receiving an initial request from a sender for obtaining a selected part of the digital signal, determining at least one quantity of information data representative of said selected part of the digital signal as a function of the set of parameters and of the initial request, providing to the sender of the initial request at least one value indicative of this determined quantity of information data.

Correlatively, the invention concerns a device of processing an encoded digital signal comprising, on the one hand, a set of data obtained by encoding a set of original data representing physical quantities, and on the other hand, a set of parameters representing the original data and parameters used during the encoding, said device comprising:

means for receiving an initial request from a sender for obtaining a selected part of the digital signal, means for determining at least one quantity of information data representative of said selected part of the digital signal as a function of the set of parameters and of the initial request, means for providing to the sender of the initial request at least one value indicative of this determined quantity of information data.

The quantity of information data representative of the selecting part of the signal is obtained from the enclosed data of the signal and provides to the user information on the selected part of the user.

However, these information data are not the encoded data themselves.

It is to be noted that the value indicative of the determined quantity of information data can either correspond to the determined quantity of information data itself or to a value derived therefrom.

For instance, in the latter case, the determined quantity of information data corresponds to a fraction of the overall quantity of information data representative of the whole selected part of the signal and the value then equals this fraction.

Thus, as a function of the value indicative of the quantity of information data he receives, the user which has previously sent the request has information enabling him to take a decision with respect to that request, that is to say either to keep on with that request or to change it.

He can thus decide to keep on with his initial request if the value indicative of the quantity of information data received corresponds for example to the value of the real total quantity available of the part selected and if it is compatible with the constraints relating to his computer equipment and/or to his requirements.

For example, the value indicative of the quantity of information data that the user receives spontaneously may correspond, as has just been seen, to the value of the real quantity available of the part selected or else to a sub-part predefined by the server. This sub-part can, for an image signal divided into tiles, be constituted for example by tiles which are entirely contained within the selected part.

The value indicative of the quantity of information data received can also be that corresponding to a layer of given quality of the image signal in the selected sub-image.

The user may also decide to obtain a value indicative of at least one other quantity of information data representative of the selected part before taking a decision on whether to keep on with his request and on the quantity of data of the selected par of the signal which he is prepared to receive, given his constraints and/or requirements.

In this way, the user can further draw up a scale of the different values received, from the values received indicative of the determined quantities of information data.

The user can then make a choice of the quantity of data of the selected part of the signal which he later wishes to receive.

According to one feature, it is also possible to provide for that scale of different values of quantities of information data representative of the selected part of the signal to be created before being supplied to the user.

The user will thus receive the above-mentioned scale of values at the outset, after having sent out an initial request for obtaining a selected part of the digital signal.

For the user, these values may be indicative of a level of quality, or of a transmission time between the server and the user's computer equipment, or the amount of memory needed to store the corresponding quantity of data.

Thus, with the help of this information, the user will be able to choose the quantity of data of the selected part of the signal which he is prepared to receive given his constraints and/or requirements, by sending out a request specifying one of the values indicated on the scale.

According to other features:
the data are arranged in the encoded digital signal in data packets P(r, q), where r and q are integers representing respectively the resolution and the quality layer of the packet.
each packet of data being arranged into successive blocks of data, the step of determining a quantity of information data comprises more particularly the following steps:
identifying the data blocks concerned by the selected part,
determining the length of the data blocks so identified,
with each data packet comprising a header, the steps of identifying and determining the length are performed on the basis of the header of the packet under consideration.

According to a second aspect, the present invention concerns a method of processing an encoded digital signal comprising, on the one hand, a set of data obtained by encoding a set of original data representing physical quantities, and on the other hand, a set of parameters representing original data and parameters used during the encoding, said method comprising the following steps:
receiving a request from a sender for obtaining at least one so-called initial quantity of data of a selected part of the digital signal, said initial quantity of data being defined with respect to at least one predetermined criterion,
analyzing the initial quantity of data of the request with respect to the real quantity of data available of the selected part of the digital signal and determined from the set of parameters and from the request,
determining a quantity of data adapted as a function of the result of the analysis and of the set of parameters,
providing the adapted determined quantity of data to the sender of the request.

Correlatively, the invention concerns a device for processing an encoded digital signal comprising, on the one hand, a set of data obtained by encoding a set of original data representing physical quantities, and on the other hand, a set of parameters representing the original data and parameters used during the encoding, said device comprising:
means for receiving a request from a sender for obtaining at least one so-called initial quantity of data of a selected part of the digital signal, said initial quantity of data being defined with respect to at least one predetermined criterion,
means for analyzing the initial quantity of data of the request with respect to the real quantity of data available of the selected part of the digital signal and determined from the set of parameters and from the request,
means for determining a quantity of data adapted as a function of the result of the analysis and of the set of parameters,
means for providing the adapted quantity of data determined to the sender of the request.

The user specifies in his initial request, as a function of his constraints and/or requirements, a quantity of data of the selected part of the signal which is defined with respect to a predetermined criterion. This criterion is established as a function of the constraints and/or requirements of the user.

Thus, for example, if the user cannot receive more than an initial quantity of data termed Vmax he will specify this in his request.

On analysis of his request, the initial quantity of data Vmax requested will be compared to the real quantity of data available of the selected part of the signal and which is determined from the set of parameters and from the request. This real quantity of data available corresponds to the total quantity contained in the part of the signal under consideration.

If this initial quantity is greater than the real quantity of data available, then the real quantity of data available will be that determined for taking account of the specificity formulated by the user.

The user will then receive, in reply to his request, this quantity adapted to his needs even though beforehand he did not have information on the real quantity available from the selected part of the signal.

This avoids him having to prepare and send two requests, a first specifying the selected part of the signal, and, after receiving and taking into account the reply to his first request, a second request specifying the initial quantity of data of the selected part of the signal defined with respect to the predetermined criterion mentioned above and which takes into account the real quantity of data available from the selected part of the signal.

The user thus rapidly obtains an adapted response, that is to say which is compatible with the predetermined criterion.

If, on the contrary, the initial quantity is smaller than the real quantity available, then the initial quantity will be determined as asked for in the request and supplied to the user who will have, here too, a quantity of data of the selected part of the signal adapted in response to a single request.

Moreover, on preparing his request, the user can define an initial quantity of data in relation to other types of predetermined criteria.

Thus, he may request an initial quantity such that the transmission time server-user will be less than a predetermined value.

In this case, on analysis of his request, the real quantity of data available of the part of the signal selected will be determined and the transmission time of this quantity will be evaluated and compared to the predetermined value supplied by the user.

As a function of the result of this comparison, either the real quantity of data available will be transmitted or another lesser quantity of data will be determined, and its transmission time will then, in turn, be evaluated in order to determine if it is compatible with the predetermined value supplied by the user.

According to one feature, the method comprises a further step of drawing up a scale of different values indicative of information data quantities based on a step of determining corresponding information data quantities each being representative of the selected part of the digital signal.

This scale of values is for example drawn up at the server where the user's request is analyzed.

The values of this scale can thus be used at the step of determining the adapted quantity of data when, for example, the user has specified in his request that he wishes to obtain a fraction of the real quantity of data available of which the value is indicated on the scale.

Furthermore, the scale of values drawn up can also be transmitted to the user who will thus have, in addition to the response to his request, more detailed information on the selected part of the digital signal such as, for example, the levels of quality available.

According to other features:
the predetermined criterion corresponds to a predetermined quantity of data;
the predetermined quantity corresponds to a fraction of the real quantity of data available in the selected part of the digital signal;
the initial quantity of data is such that the time of obtaining this quantity of data is less than a predetermined time.

According to another aspect, the invention also relates to:
a means of storing information which can be read by a computer or a microprocessor storing instructions of a computer program making it possible to implement the processing method according to the invention as it is briefly set out above, and
a means of storing information, which is partially or totally removable, and which can be read by a computer or a microprocessor storing instructions of a computer program making it possible to implement the processing method according to the invention as it is briefly set out above.

According to still another aspect, the invention relates to a computer program which can be directly loaded into a programmable device, comprising instructions or portions of code for implementing steps of the processing method of the invention as briefly set out above, when said computer program is executed on a programmable device.

Since the characteristics and advantages relating to the device for processing an encoded digital signal, to the information storage means and to the computer program, are the same as those set out above concerning the processing method according to the invention, they will not be repeated here.

The characteristics and advantages of the present invention will emerge more clearly from a reading of the following description, given solely by way of illustration and made with reference to the accompanying drawings, in which.

Figure 4A:
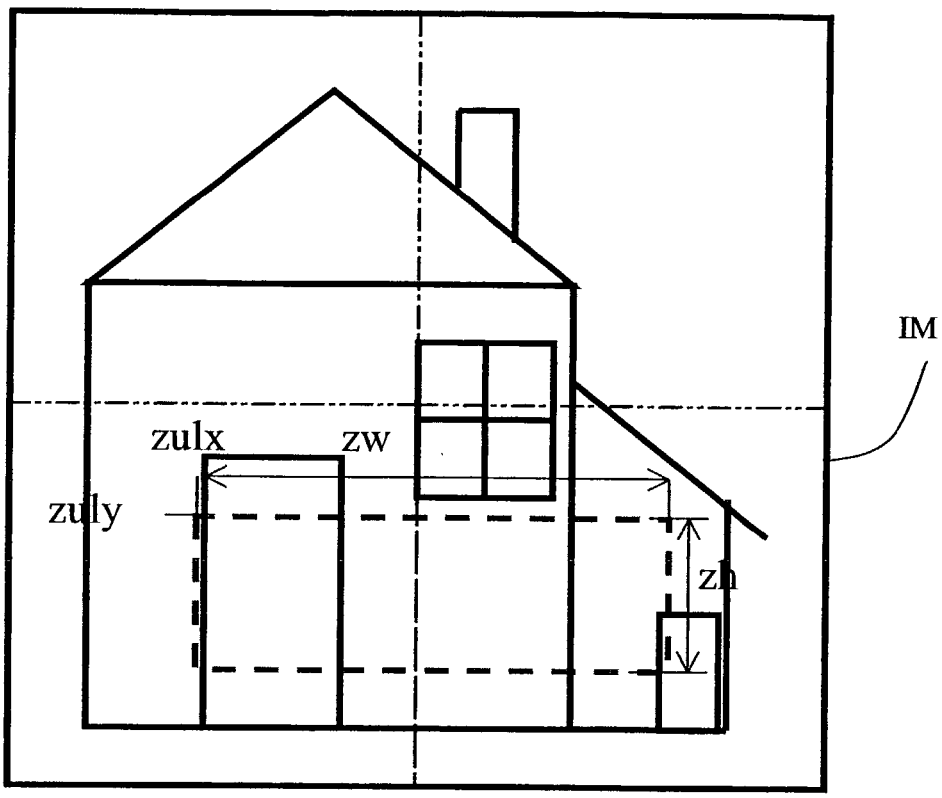
FIG. 4a shows an image before encoding.
Figure 4B:
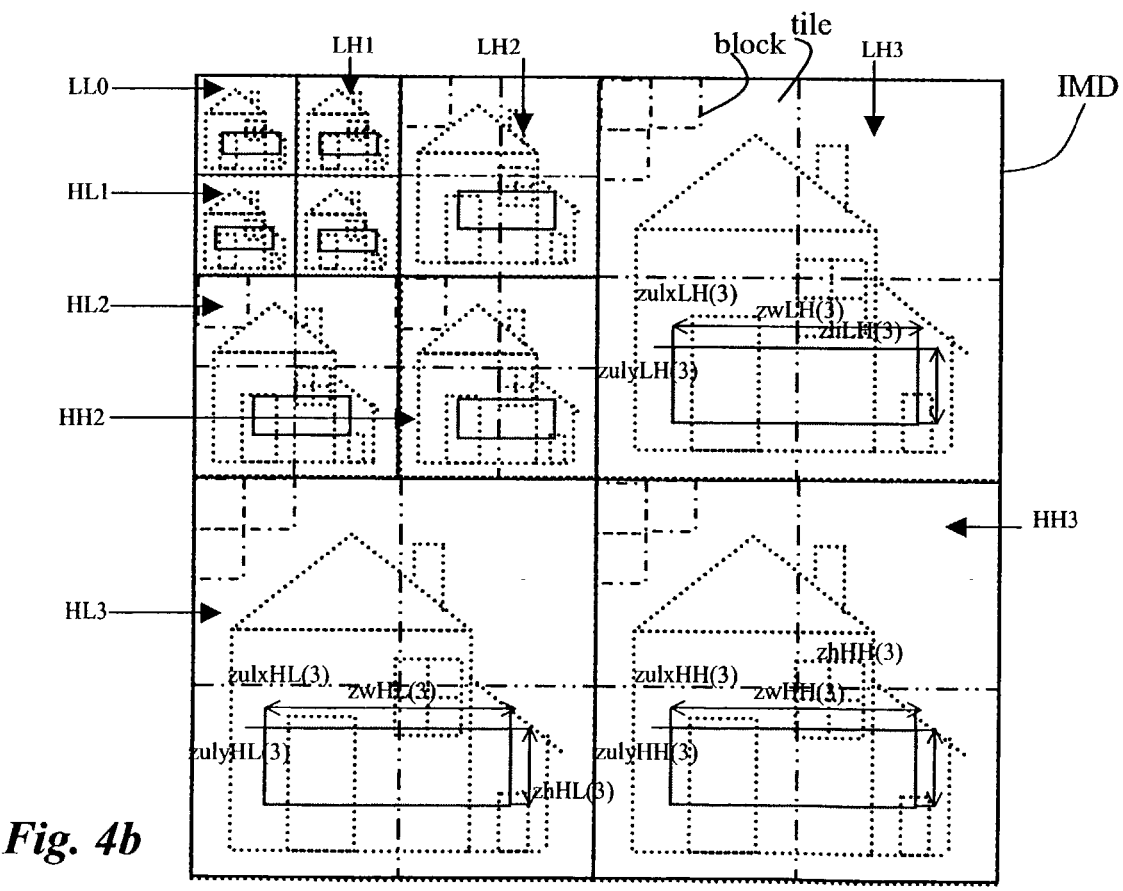
Figure 4C:
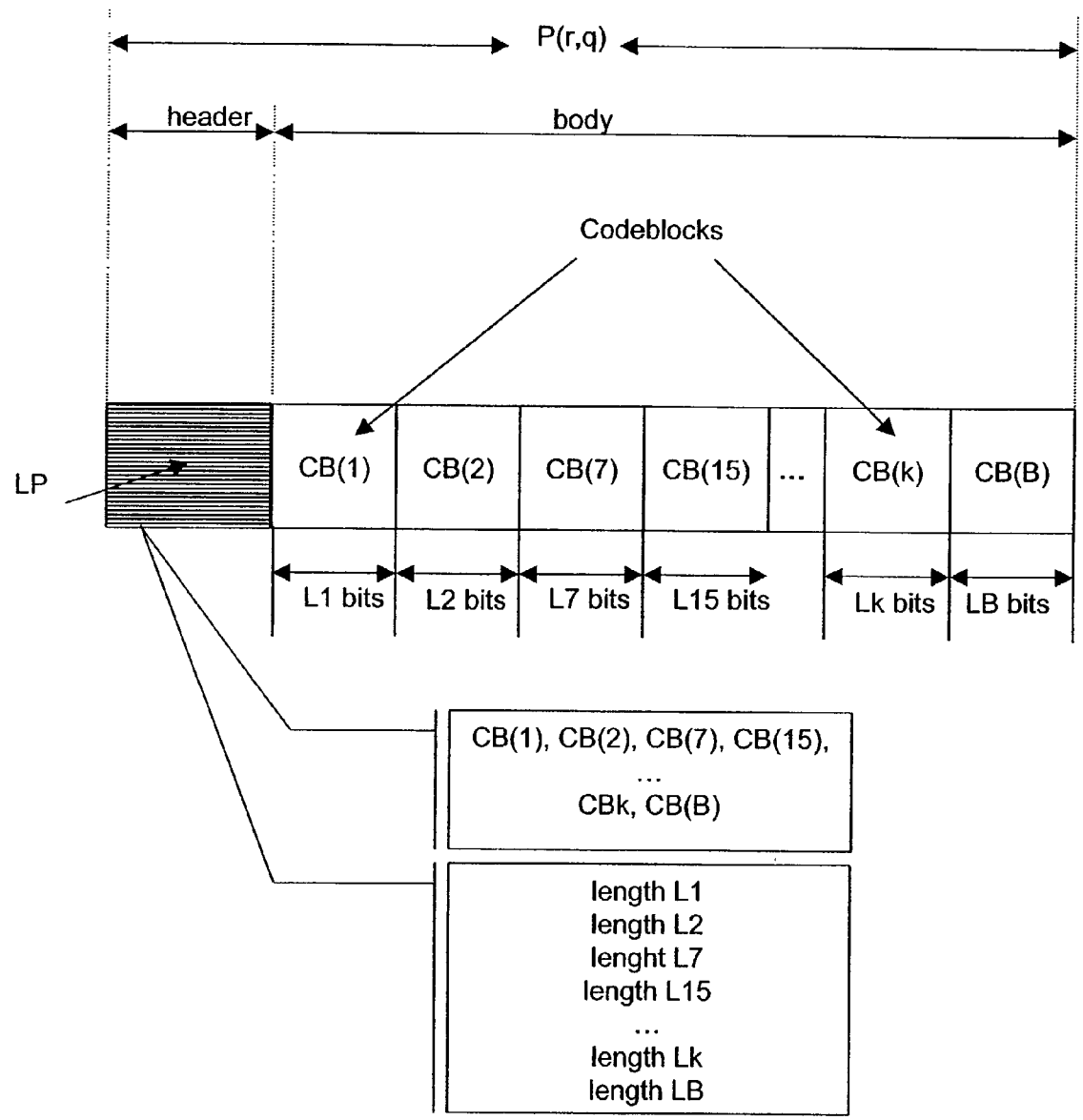
Figure 4D:
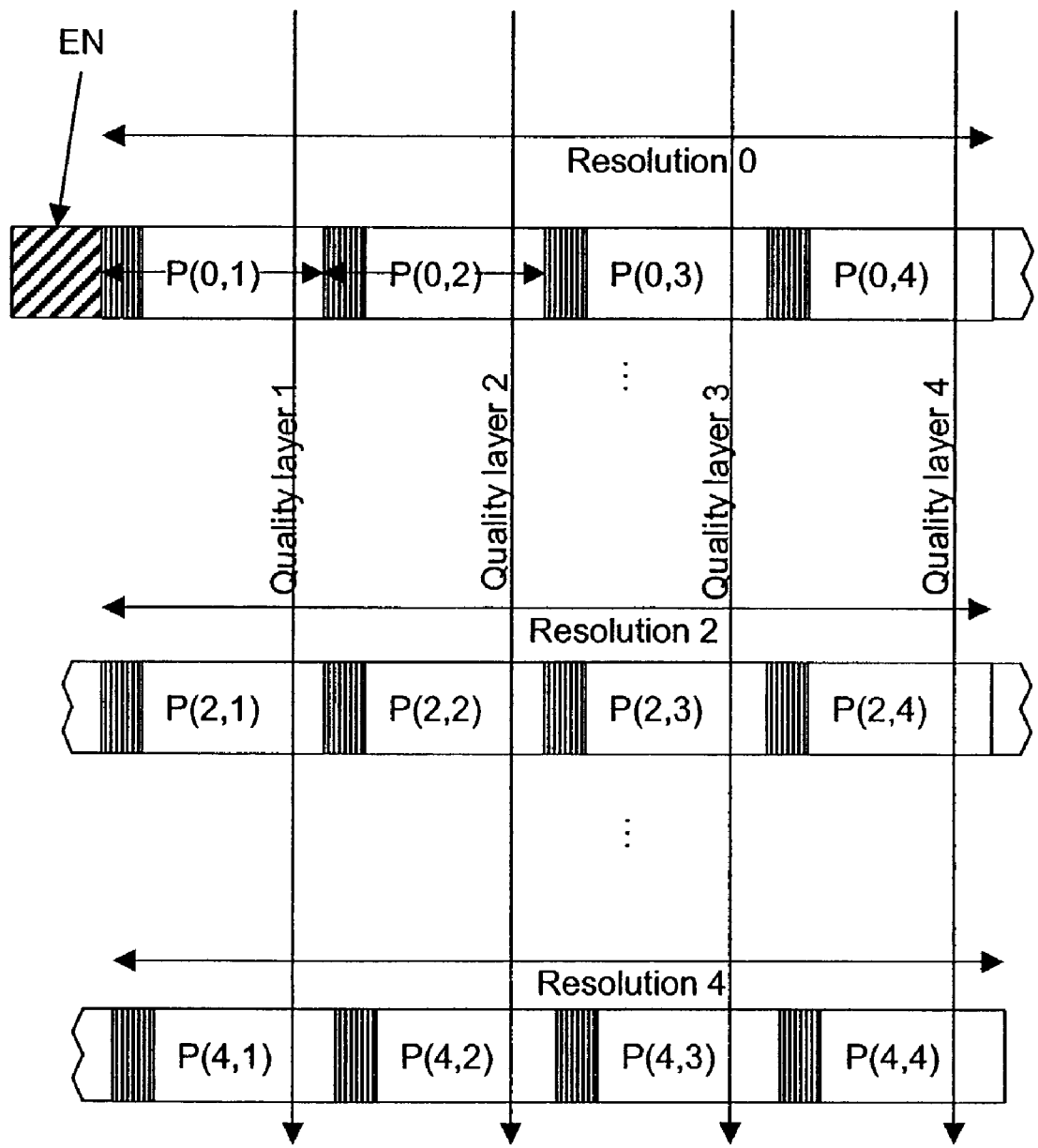
Figure 4E:
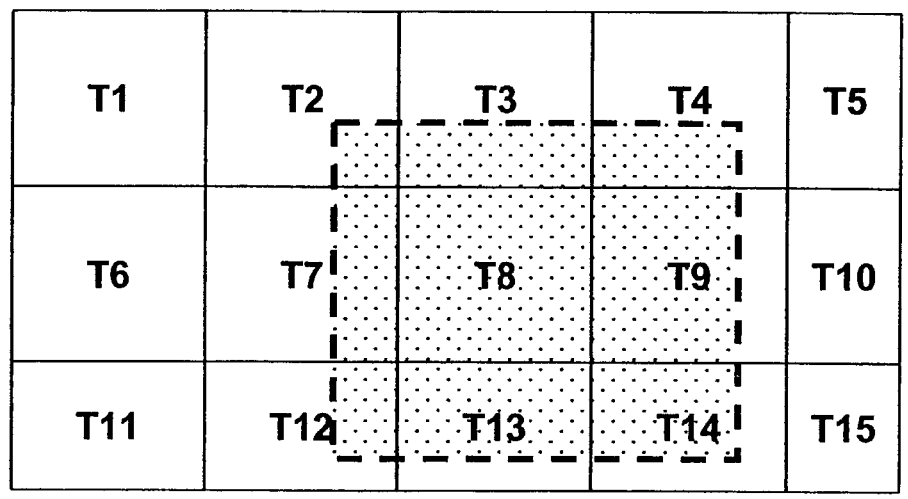
Figure 12:
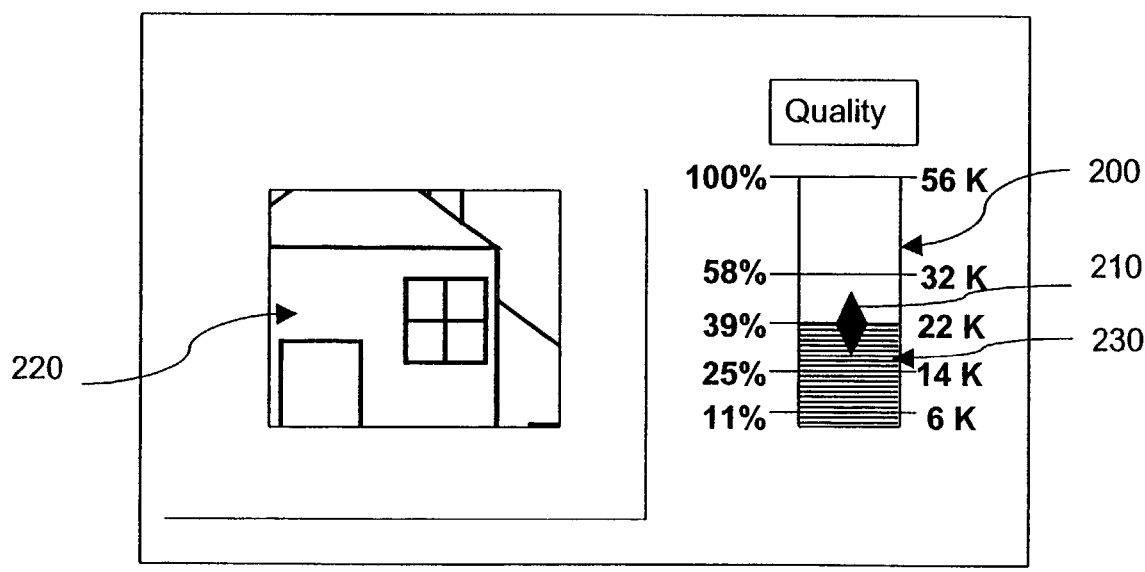
Figure 5:
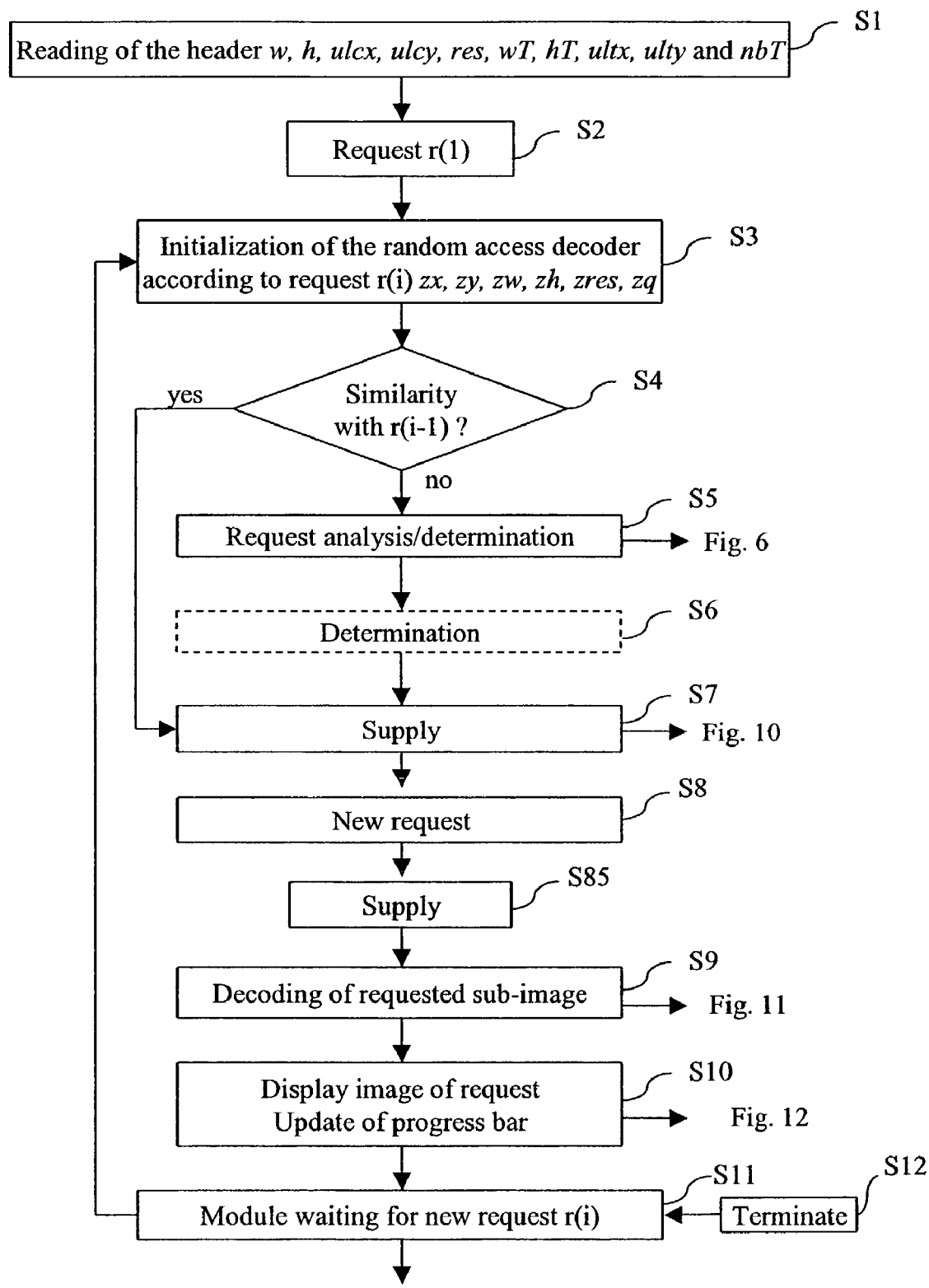
Figure 6:
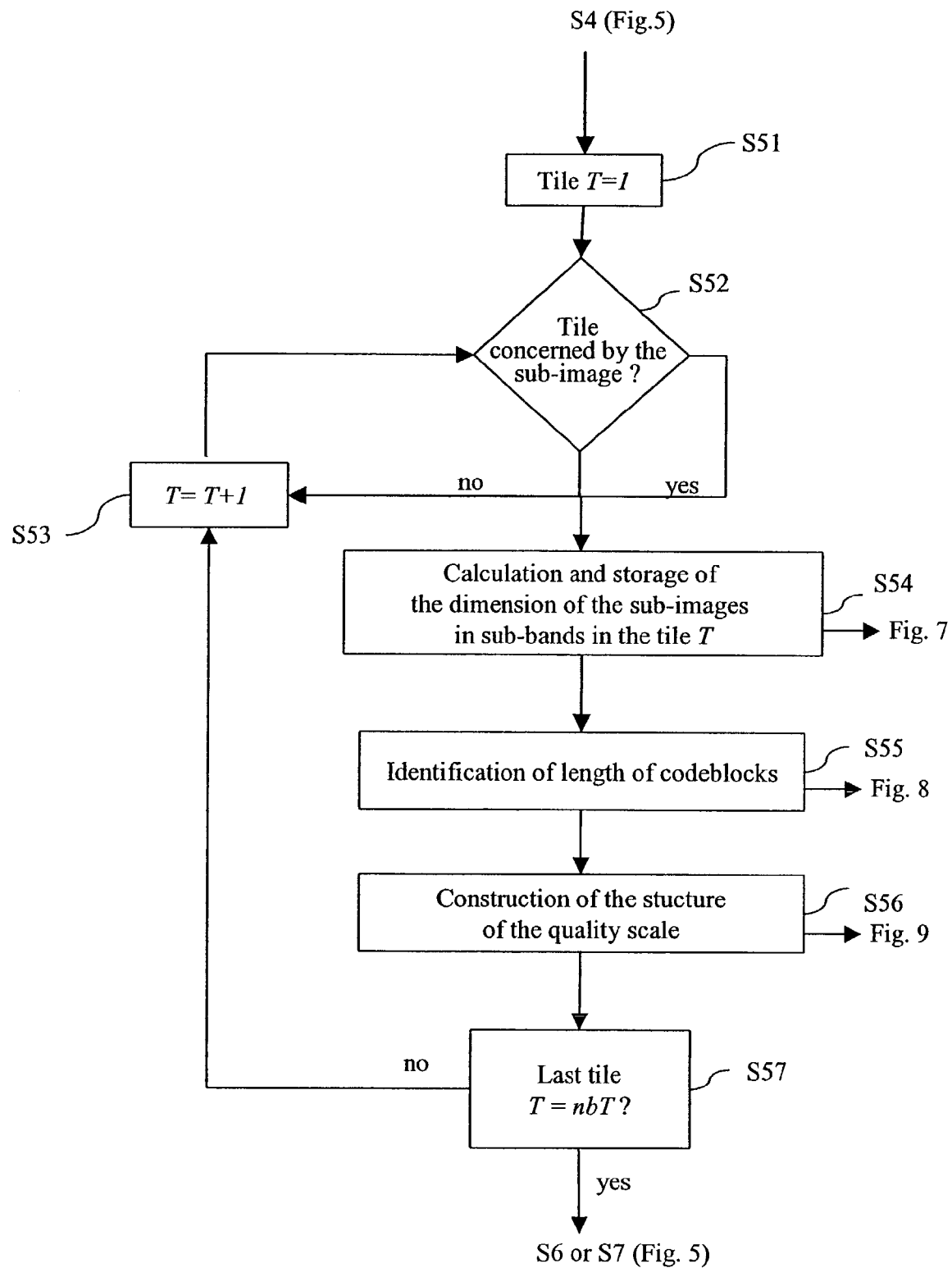
Figure 7:
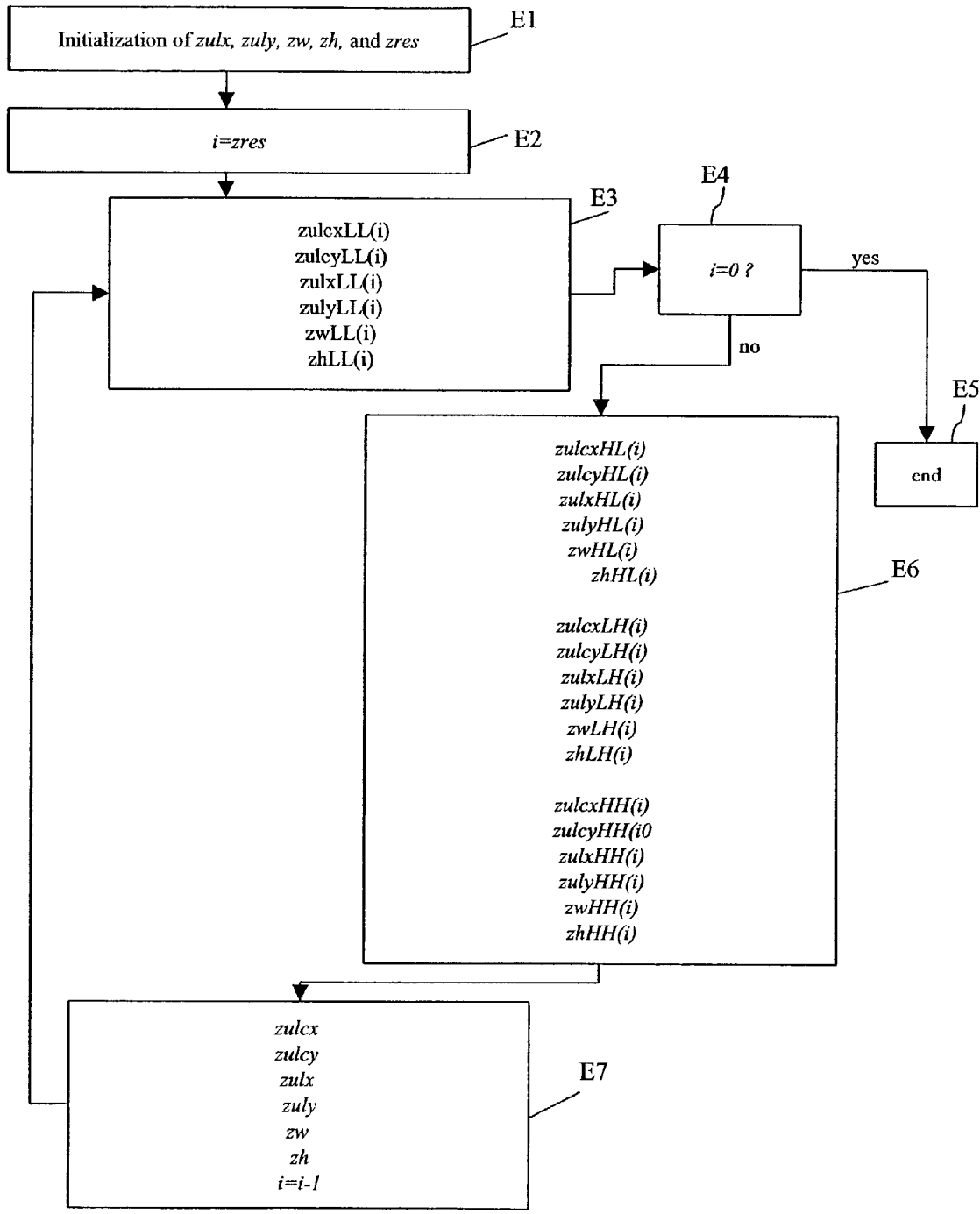
Figure 8:
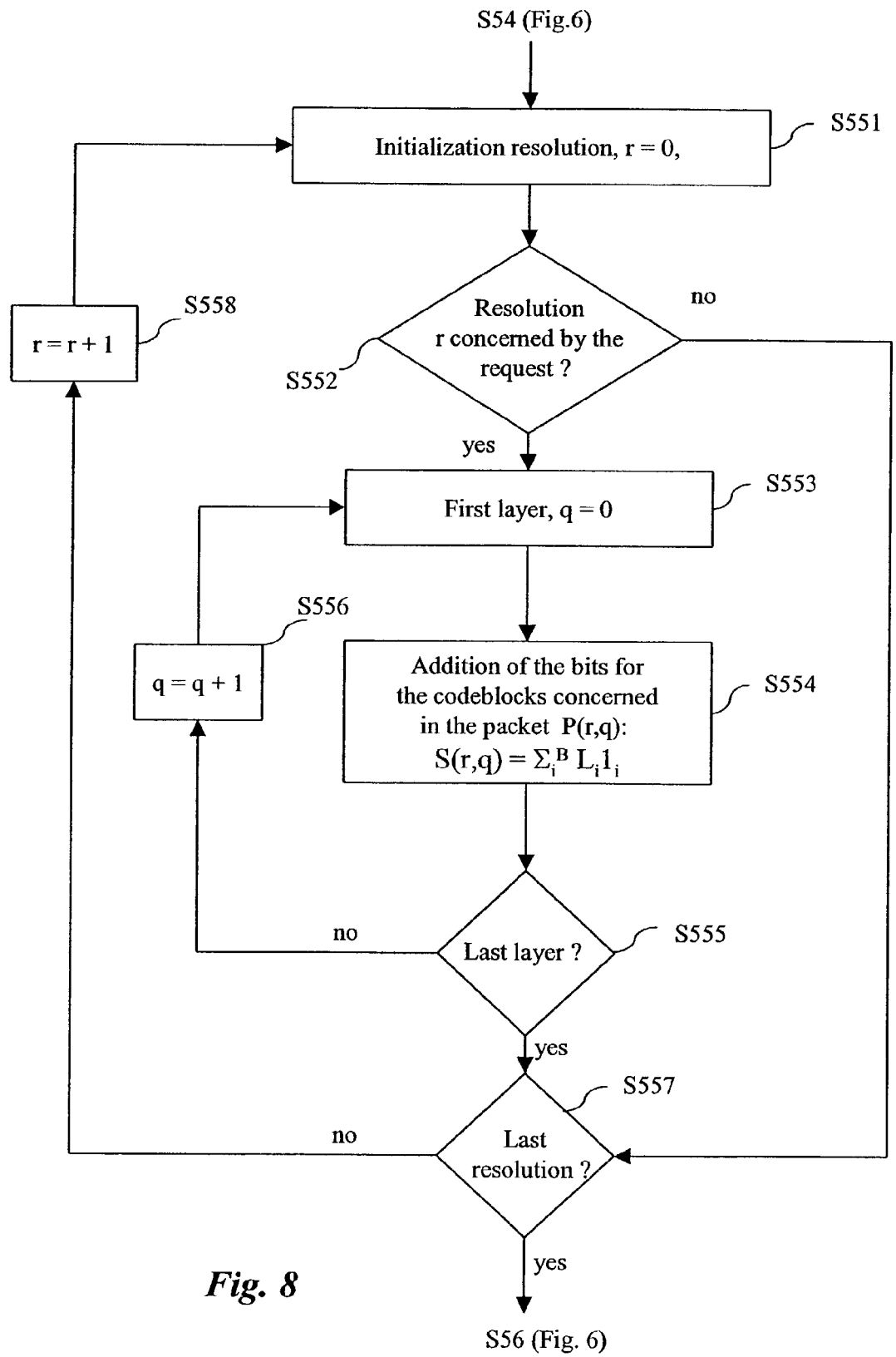
Figure 10:
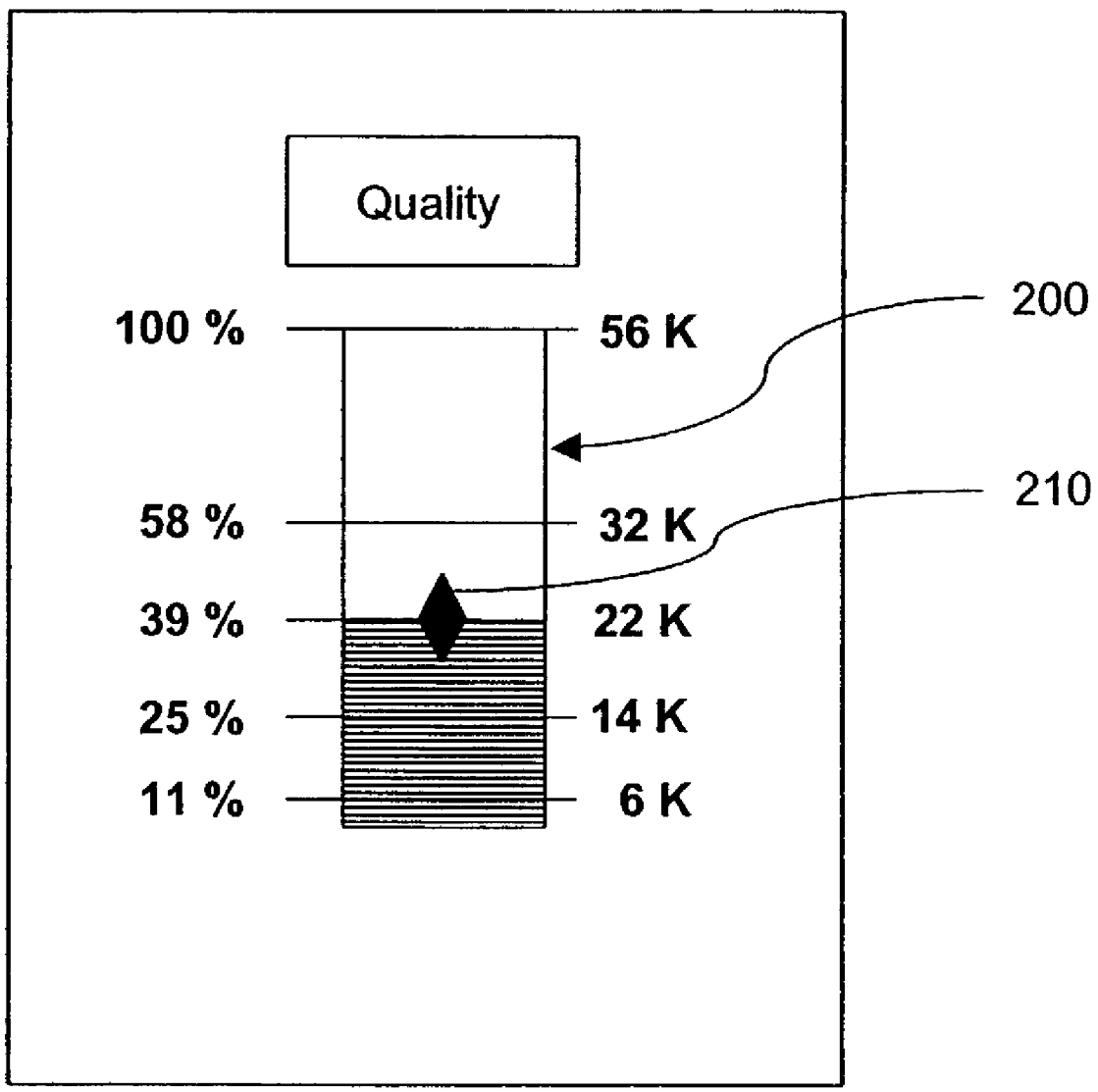
Figure 11:
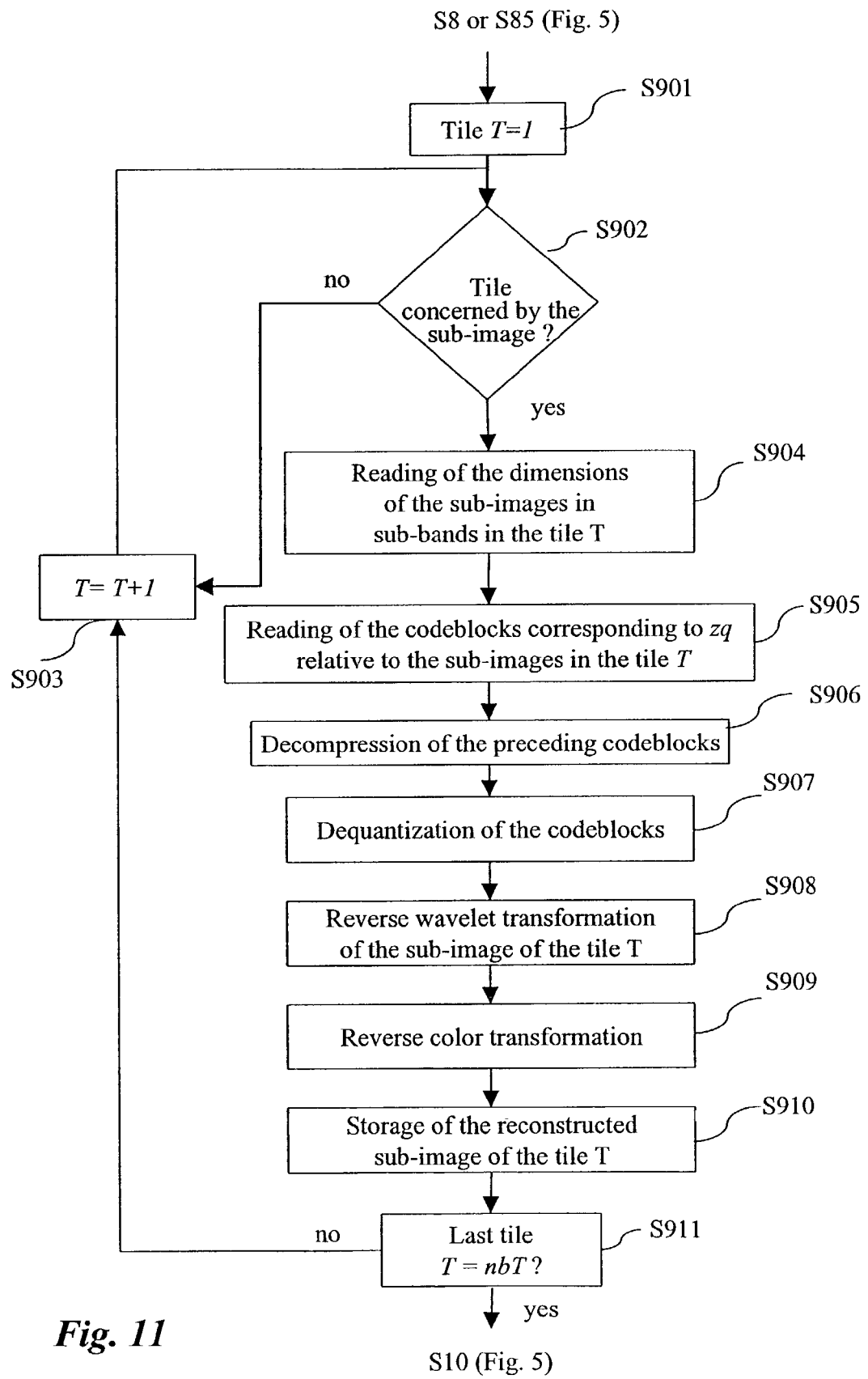

FIG. 4b shows the decomposition into frequency sub-bands of the image of FIG. 4a, FIG. 4c is a diagram of the structure of a data packet in an encoded image signal according to part 1 of the JPEG2000 standard entitled "JPEG2000 Image Coding System", FIG. 4d shows the structure of an image signal of which the data packets have progressive resolution levels, FIG. 4e shows the request of a user having selected a sub-image within an image partitioned into tiles, FIG. 5 is an algorithm for processing an encoded image, FIG. 6 is an algorithm for constructing a scale of values which is implemented during the execution of step S5 of FIG. 5, FIG. 7 is an algorithm for calculating the dimension of a sub-image which is implemented during the execution of the step S54 of the algorithm of FIG. 6, FIG. 8 is an algorithm for determining a quantity of data present in the sub-image selected by the user and which is implemented during the execution of the step S55 of FIG. 6, FIG. 9 shows a table giving the values obtained of a quality scale, FIG. 10 is a possible graphical representation of a quality scale according to the table of FIG. 9, FIG. 11 is an algorithm for decoding tiles making up a part of the encoded image, FIG. 12 is a possible representation of the response proposed to the user further to one or more requests by him.

Figure 1:
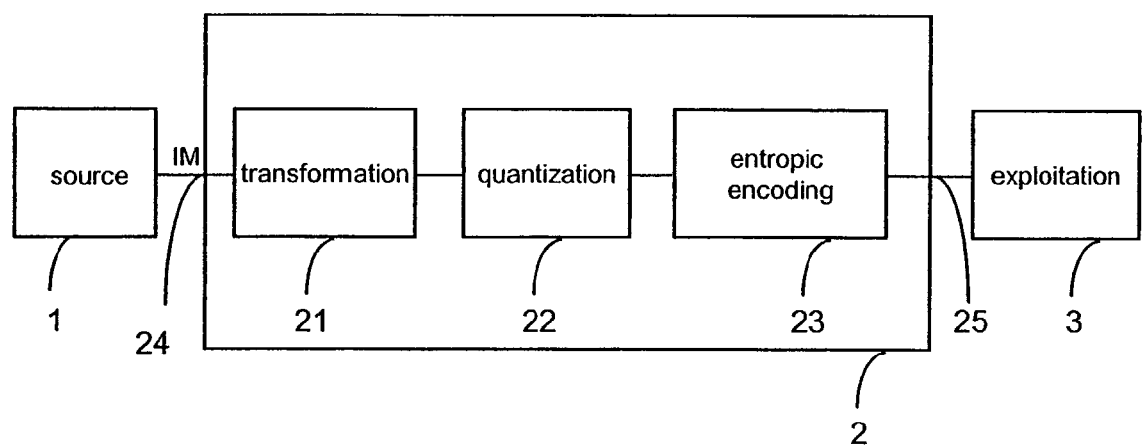
FIG. 1 is a diagram of a device for encoding a digital signal.

According to a chosen embodiment shown in FIG. 1, a data encoding device is a device 2 which comprises an input 24 to which a source 1 of non-encoded data is connected.

The source 1 comprises for example a memory means, such as a random access memory, a hard disk, a diskette or a compact disc, for storing non-coded data, this memory means being associated with a suitable reading means for reading the data therein. A means for recording the data in the memory means can also be provided.

It will be considered more particularly hereinafter that the data to be encoded are a series of original digital samples representing physical quantities and representing, for example, an image IM.

The present invention could be applied to a sound signal in which it is wished to decode an extract of a compressed audio signal.

The user may indeed wish to obtain a quantity of data representing a time window which constitutes an extract of this compressed audio signal.

The source 1 supplies a digital image signal IM at the input of the encoding circuit 2. The image signal IM is a series of digital words, for example bytes. Each byte value represents a pixel of the image IM, here with 256 levels of gray, or black and white image. The image can be a multispectral image, for example a color image having components in three frequency bands, of the red-green-blue or luminance and chrominance type. Either the color image is processed in its entirety, or each component is processed in a similar manner to the monospectral image.

Encoded data using means 3 are connected at the output 25 of the encoding device 2.

The using means 3 comprises for example means of storing encoded data, and/or means of transmitting encoded data.

The encoding device 2 comprises conventionally, as from the input 24, a transformation circuit 21 which uses decompositions of the data signal into frequency sub-band signals, so as to perform an analysis of the signal.

The transformation circuit 21 is connected to a quantization circuit 22. The quantization circuit implements a quantization which is known per se, for example a scalar quantization, or a vector quantization, of the coefficients, or groups of coefficients, of the frequency sub-band signals supplied by the circuit 21.

The circuit 22 is connected to an entropic encoding circuit 23, which performs an entropic encoding, for example a Huffman encoding, or an arithmetic encoding, of the data quantized by the circuit 22.

Figure 2:
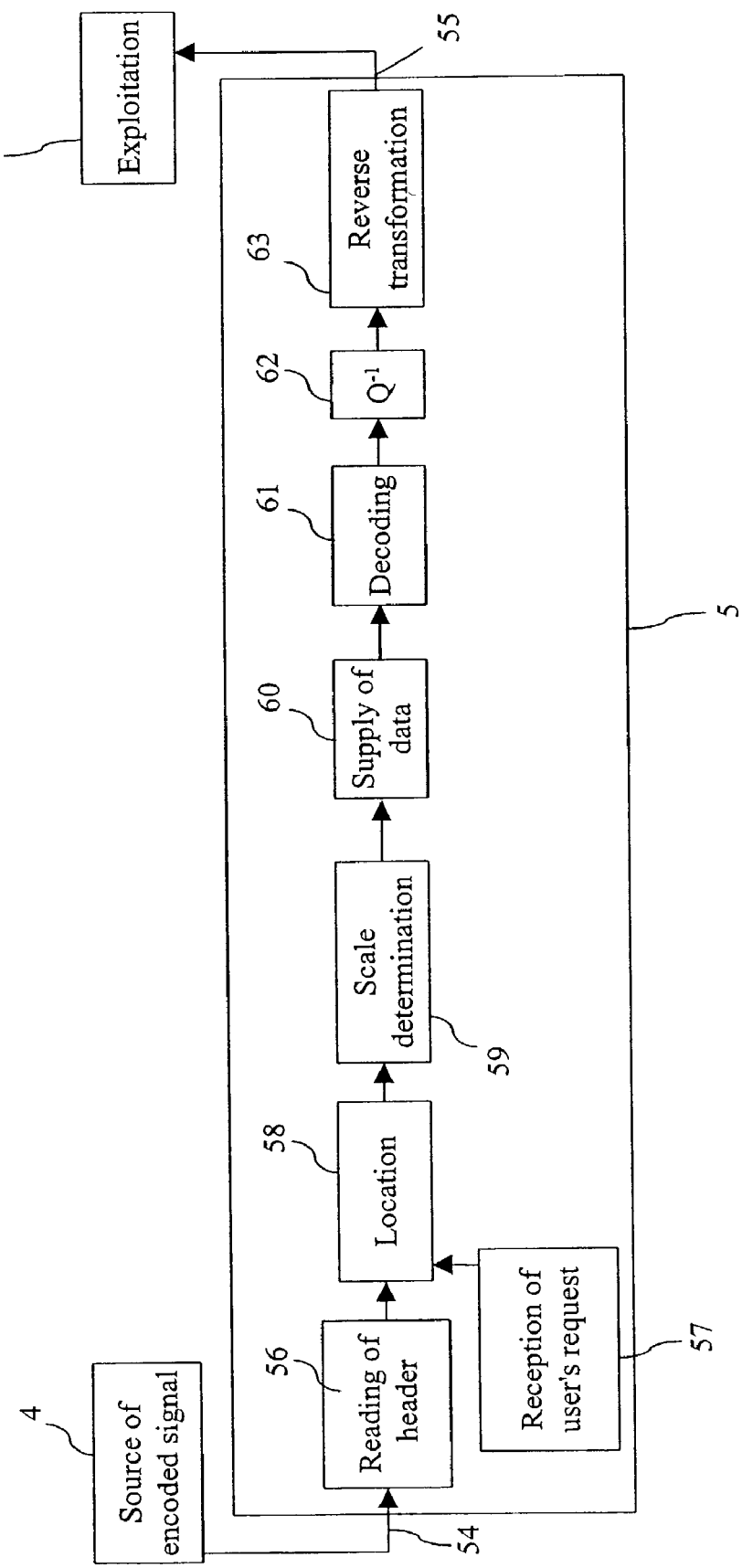
FIG. 2 is a diagram of a device for processing an encoded digital signal.

FIG. 2 shows a device 5 for processing data according to the invention, as a function of a request produced by a user, the data having been encoded by the device 2.

Means 4 using encoded data are connected at the input 54 of the processing device 5. The means 4 comprises for example encoded data memory means, and/or means of receiving encoded data which are adapted to receive the encoded data transmitted by the transmission means 3.

Decoded data using means 6 are connected at the output 55 of the encoding device 5. The user means 6 are for example means for viewing images, or means for sound reproduction, according to the nature of the data processed.

The decoding device 5 generally performs operations which are the reverse of those of the encoding device 2 except for the first operations.

The device 5 has a circuit 56 for reading all the parameters representing the original data and parameters used during encoding. The header parameters of the encoded signal are applied to the input 54 of said device.

This circuit 56 makes it possible to read the data concerning the size of the set of the original data (image) constituting the image signal and its resolution, that is to say the number of levels of decomposition into frequency subbands of this set.

In the case where the image signal is partitioned into zones, also referred to as tiles, this circuit reads the data concerning these tiles, namely their number, width, height and position in the image.

The device 5 also comprises a circuit 57 for receiving a request sent out by a user and which comprises a selection of a subset of original data (sub-image) forming part of the set of original data constituting the image signal.

The selection of this original sub-image is characterized by data concerning the size and resolution desired and possibly the quality desired.

This request for obtaining a part of the image can also be made by means of a graphical interface which will also check, when the user makes his choice, the validity of the selected sub-image.

This is because the sub-image selected must have a size less than or equal to that of the image in the resolution in question.

This request can also be made remotely, for example in an architecture of client-server type.

Note that according to a first aspect of the invention, it is possible for the request to specify only the sub-image desired by the user. According to a second aspect, the request further comprises a so-called initial quantity of data of the sub-image and which is defined with respect to a predetermined criterion established from the constraints and/or requirements of the user.

The circuits 56 and 57 are connected to a so-called location circuit 58 which thus receives the data concerning the image and the sub-image selected with a view to performing a calculation of the size of the selected sub-image and of its position.

This thus makes it possible to locate the sub-image selected in the image.

The processing device 5 also comprises a circuit 59 for determining at least one quantity of information data representative of the selected sub-image. and further, for determining a scale of values indicative of different quantities of information data so determined.

This quantity of information data does not correspond to the encoded data constituting the selected part of the signal but is obtained from these encoded data as will be seen subsequently.

The device 5 also comprises a circuit 60 for providing one or more values indicative of quantities of information data representative of the sub-image selected by the user or one or more actual quantities of data.

According to the first aspect of the invention mentioned above, the circuit 60 supplies the values indicative of these quantities to the user who chooses a value and receives the corresponding quantity of data of the selected part of the signal which should then be decoded to proceed with its display.

It is to be noted that the value or values indicative of one or several quantities of information data are provided to the user which will then take a decision as to choosing the quantity of data of the selected part of the signal that he wants to receive.

This avoids to automatically send the encoded data constituting the selected part of the signal without giving to the user the possibility to take a decision.

According to the second aspect mentioned above, the user directly receives a quantity of data of the selected part of the signal adapted to the constraints and/or requirements which he formulated in his request.

He will next proceed with the decoding of this quantity of data and with the display.

The functioning of this circuit will be detailed subsequently with reference to FIG. 5 and following.

The device 5 also comprises an entropic decoding circuit 61, which performs an entropic decoding corresponding to the encoding of the circuit 23 of FIG. 1. This decoding is performed on the quantity of data of the selected part of the signal chosen by the user (first aspect) or on that which will have been adapted to the initial quantity of data contained in his request (second aspect). The circuit 61 is connected to a dequantization circuit 62, corresponding to the quantization circuit 22. The circuit 62 is connected to a reverse transformation circuit 63, corresponding to the transformation circuit 21. The transformations envisaged here perform a synthesis of the digital signal, from frequency sub-band signals.

Note that the arrows between the blocks represent the data of the encoded image which pass between these blocks.

Information such as the size, resolution and possibly the quality of the data to be decoded are supplied to the circuits 61, 62 and 63.

The processing device can be integrated into a digital apparatus, such as a computer, printer, facsimile machine, scanner or a digital camera, for example.

In the context of a client-server type architecture, the user remotely sends out a request for obtaining a part of the image addressed to the server which possesses the source of the encoded signal 4 of FIG. 2 as well as the circuits 56 to 60. The user, on the other hand, has circuits 61 to 63 and 6 to enable him to decode and display the quantity of data received in response to his request.

Thus, the server may for example be a computer, and the client device may for example be a digital camera, a mobile telephone, a PDA (Personal Digital Assistant), etc.

Figure 3:
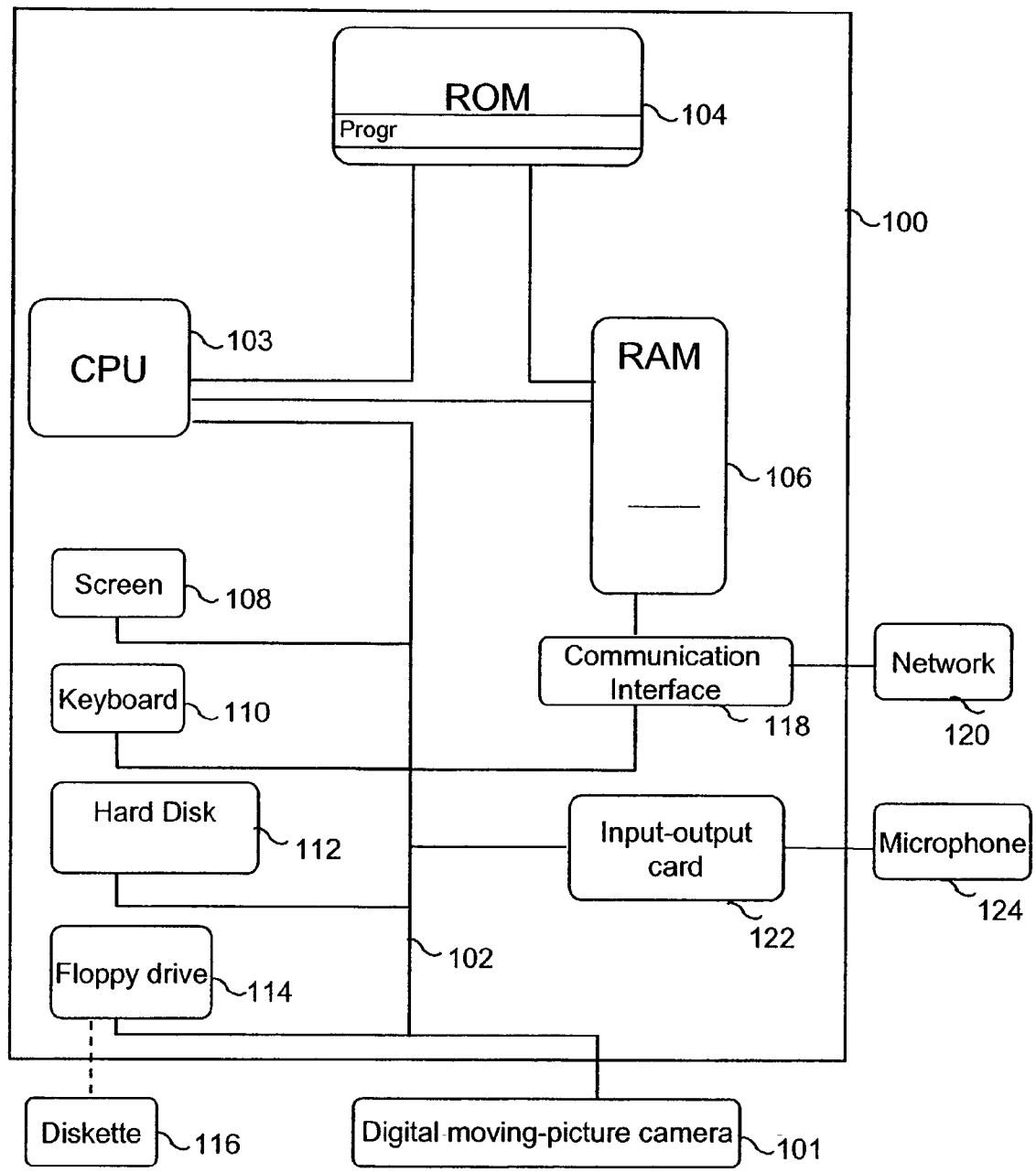
FIG. 3 shows an embodiment of the processing device of FIG. 2.

With reference to FIG. 3, an example of a programmable device 100 implementing the invention is now described. This device is adapted to transform a digital signal and to synthesize it.

According to the chosen embodiment shown in FIG. 3, a device implementing the invention is for example a microcomputer 100 connected to different peripherals, for example a digital moving-picture camera 101 (or a scanner, or any means of acquiring or storing an image) connected to a graphics card and providing data to be decoded.

The device 100 comprises a communication bus 102 to which there are connected:

- a central processing unit 103 (microprocessor),
- a read only memory 104, comprising a program "Progr",
- a random access memory 106, comprising registers adapted to record variables modified during the execution of the aforementioned program,
- a screen 108 for displaying the data to be decoded or serving as an interface with the user, who can parameterize certain decoding modes, using a keyboard 110 or any other means, such as a mouse,
- a hard disk 112,
- a floppy drive 114 adapted to receive a diskette 116,
- an interface 118 for communicating with a communication network 120 able to transmit encoded digital data or to receive encoded data which are to be encoded by the device,
- an input/output card 122 connected to a microphone 124 (the data to be processed according to the invention in that case constitute an audio signal).

The communication bus affords communication between the different elements included in the microcomputer 100 or connected to it. The representation of the bus is not limiting and, in particular, the central processing unit is able to communicate instructions to any component of the microcomputer 100 directly or by means of another element of the microcomputer 100.

The program denoted "Progr" enabling the programmable device to implement the invention can be stored for example in read only memory 104 (referred to as ROM in the drawing) as depicted in FIG. 3. According to a variant, the diskette 116, just like the hard disk 112, can contain encoded data as well as the code of the invention which, once read by the device 100, will be stored in the hard disk 112. In a second variant, the program can be received in order to be stored in an identical fashion to that described previously by means of the communication network 120.

The diskettes can be replaced by any information carrier such as, for example, a CD-ROM or a memory card. In general terms, an information storage means which can be read by a computer or microprocessor, integrated or not into the device, and possibly removable, stores a program implementing the processing method according to the invention In more general terms, the program can be loaded into one of the storage means of the device 100 before being executed.

The central processing unit 103 will execute the instructions relating to the implementation of the invention, which are stored in the read only memory 104 or in the other storage means. On powering up, the processing and decoding programs, which are stored in a non-volatile memory, for example the ROM 104, are transferred into the random access memory RAM 106, which will then contain the executable code of the invention, as well as registers for storing the variables necessary for implementing the invention.

FIG. 4a is a diagram of a digital image IM output from the image source 1 in FIG. 1.

This figure is decomposed by the transformation circuit 21 of FIG. 1, which is a dyadic decomposition circuit with three decomposition levels.

The circuit 21 is, in this embodiment, a conventional set of filters, respectively associated with decimators by two, which filter the image signal in two directions, into sub-band signals of high and low spatial frequencies. The relationship between a high-pass filter and a low-pass filter is often determined by the conditions for perfect reconstruction of the signal. It should be noted that the vertical and horizontal decomposition filters are not necessarily identical, although in practice this is generally the case. The circuit 21 comprises here three successive analysis units for decomposing the image IM into sub-band signals according to three decomposition levels.

Generally, the resolution of a signal is the number of samples per unit length used for representing the signal. In the case of an image signal, the resolution of a sub-band signal is related to the number of items of data per unit length used for representing this sub-band signal horizontally and vertically. The resolution depends on the number of decompositions made, the decimation factor and the initial image resolution.

The first analysis unit receives the digital image signal IM and, in a known manner, delivers as an output four sub-band signals $LL_3$, $LH_3$, $HL_3$ and $HH_3$ with the highest resolution $RES_3$ in the decomposition (FIG. 4b).

The sub-band signal $LL_3$ comprises the components, or data, of low frequency, in both directions, of the image signal. The sub-band signal $LH_3$ comprises the image signal components of low frequency in a first direction and of high frequency in a second direction. The sub-band signal $HL_3$ comprises the components of high frequency in the first direction and the components of low frequency in the second direction. Finally, the sub-band signal $HH_3$ comprises the components of high frequency in both directions.

Each sub-band signal is a set of real data (this could also be integers) constructed from the original image, which contains information corresponding to a respectively vertical, horizontal and diagonal orientation of the content of the image, in a given frequency band. Each sub-band signal can be likened to an image.

The sub-band signal $LL_3$ is analyzed by an analysis unit similar to the previous one in order to supply four sub-band signals $LL_2$, $LH_2$, $HL_2$ and $HH_2$ of resolution level $RES_2$.

Each of the sub-band signals of resolution $RES_2$ also corresponds to an orientation in the image.

The sub-band signal $LL_2$ is analyzed by an analysis unit similar to the previous one in order to supply four sub-band signals $LL_0$ (by convention), $LH_1$, $HL_1$ and $HH_1$ of resolution level $RES_1$. It should be noted that the sub-band $LL_0$ by itself forms the resolution $RES_0$.

Each of the sub-band signals of resolution $RES_1$ also corresponds to an orientation in the image.

FIG. 4b shows the image IMD resulting from the decomposition of the image IM, by the circuit 21, into ten sub-bands and according to four resolution levels: $RES_0$ ($LL_0$), $RES_1(LL_2)$, $RES_2$ ($LL_3$), $RES_3$ (original image). The image IMD contains as much information as the original image IM, but the information is divided in frequency according to three decomposition levels.

Naturally the number of decomposition levels and consequently of sub-bands can be chosen differently, for example 16 sub-bands over six resolution levels, for a bi-dimensional signal such as an image. The number of sub-bands per resolution level can also be different. In addition, it is possible for the decomposition not to be dyadic. The analysis and synthesis circuits are adapted to the dimension of the signal processed.

In FIG. 4b the data resulting from the transformation are arranged sub-band by sub-band.

It will be noted that the image IM in FIG. 4a is for example separated into zones, referred to as tiles, only some of which have been shown in order not to clutter the figure. When the image is decomposed by the circuit 21, this image can be decomposed tile by tile.

By collecting together in the same figure the different images resulting from the tile by tile decomposition of the image IM, the result is the image IMD of FIG. 4b, on which the tiles appear.

In addition, each tile of the image IMD is partitioned into data blocks, some of which are shown in FIG. 4b.

It should be noted that partitioning of the image into tiles is not essential for the implementation of the invention.

In that case, the image is then only partitioned into data blocks.

The circuits 22 and 23 of FIG. 1 apply independently to each block of each tile in question. The image signal encoded by the circuit 2 thus conveys blocks of data obtained by encoding of the original data and which constitute the bitstream.

The encoded image signal also comprises header parameters as indicated above with reference to FIG. 2.

This header comprises in particular the parameters concerning the size of the image, namely its width w and its height h, its position with respect to a point of reference represented by the coordinates ulcx (the X-axis) and ulcy (the Y-axis), as well as the number of resolutions res.

Moreover, as the encoded image comprises tiles, the header parameters also comprise information concerning these tiles, namely their number nbT, their width wT, their height hT and their position represented by the coordinates ultx and ulty.

The header parameters of the encoded signal make it possible, as soon as the latter is received and read, to have information on the encoding of the signal.

In the encoded digital image signal, the data are arranged in data packets P(r,q), where r and q are integers representing respectively the resolution and the quality layer of the packet.

A data packets P(r,q) is shown in FIG. 4c.

This packet contains a list LP called a "packet header" which forms part of the header information mentioned above and a packet body. This list describes the content of the data included in the packet body and a series of encoding data CB of each of the data blocks, at the resolution r and for the layer of quality q.

The list LP gives the list of the blocks actually present in the packet and parameters concerning each block. The encoding data CB of a block are called a codeblock.

In particular, the list LP gives the total length in bits Lk of each codeblock CB(k) that is to say the quantity of data contained in the codeblock. It is this particular value which is taken into account for determining the number of bits if the codeblock is included in the sub-image projected into the sub-band under consideration.

In FIG. 4d, the packets of the encoded image signal are for example organized by resolution. The binary stream contains firstly all the packets concerning the first resolution, then the packets of the second resolution, and so on. This arrangement makes it possible to extract the resolutions one by one without having to go through the entire file. The file is then said to have progressive resolution.

It should be noted that the binary stream could be organized differently. For example, the packet P(0,1) could be followed by the packet P(1,1), followed itself by the packet P(2,1) and so on. In that case, the first layer corresponds to a given quantity for all the resolutions, for example 0,01 bpp (bit per pixel). The following layers contain additional data and correspond respectively to higher qualities. The representation of the data is then progressive in quality.

It should also be noted that as the image is decomposed into tiles in this example, the binary stream is organized in a similar manner, the data being grouped together tile by tile.

FIG. 4e shows in dotted lines, on an image partitioned into tiles T1 to T15 at a given resolution, the sub-image selected by the user in his initial request.

More particularly, the sub-image selected by the user in his request is shown in FIGS. 4a and 4b by the frame of width zw and of height zh.

FIG. 5 shows an algorithm comprising different instructions or portions of code corresponding to steps of the method of processing the encoded digital image signal according to the invention.

The computer program denoted "Progr", which is based on this algorithm, is stored in the read only memory 104 of FIG. 3, on initialization of the system, and transferred into the random access memory 106. It is then executed by the central processing unit 103, which thus makes it possible to implement the method according to the invention in the device of FIG. 3.

The method according to the first aspect of the invention will be described first of all. The method according to the second aspect of the invention will then be described dealing only with those parts of the description of the first aspect which are different.

As shown in FIG. 5, a first step of the algorithm, denoted S1, consists of reading the header parameters (set of parameters) mentioned above of the encoded image signal. These parameters are represented by the following notations: w, h, ulcx, ulcy, res, wT, hT, ultx, ulty and nbT.

These data are stored in registers of the random access memory 106 of FIG. 3.

The following step S2 is a step of receiving a request for obtaining the sub-image selected by the user (sender of the request) in the image under consideration. Reference will sometimes be made to the image shown in FIGS. 4a and 4b and sometimes to that of FIG. 4e according to the point to be illustrated.

To do this, the user specifies in his request the size of this sub-image represented by the notations zw (width of the sub-image) and zh (height of the sub-image), as well as the coordinates zulx (x-coordinate of the top corner of the sub-image) and zuly (the y-coordinate of the top left-hand corner of this sub-image) making it possible to locate this sub-image in the image IM in question (FIG. 4a).

The user can also specify in his request the resolution, denoted zres, of the chosen sub-image.

The user can, for example, request a sub-image with a resolution less than that of the image under consideration.

Thus, for example, only the sub-bands $LL_0$, $LH_1$, $HL_1$, $HH_1$, $LL_2$, $LH_2$, $HL_2$ and $HH_2$ may be concerned.

The user may furthermore specify the desired quality in his request, denoted zq.

The data zw, zh, zulx, zuly and zres are also stored in registers of the random access memory 106 of FIG. 3.

It would be possible for example to be in the situation where the user interrogates a remote server in order to obtain a selected part of the encoded signal.

The following step S3 is an initialization step which takes into account the parameters contained in the request enumerated above in course of being processed.

During this step, the system processing the request, for example the server, locates the sub-image in the image by virtue of the header parameters concerning the size and resolution of the image, and by virtue of the parameters concerning the size and resolution of the requested sub-image.

The following step S4 constitutes a test for verifying if the request in course of being processed possesses elements in common with the previous request.

The test performed will examine if the spatial zone (size and position) of the requested sub-image and the desired resolution are the same as in the previous request.

If the requested resolution and spatial zone of the sub-image are the same as previously, then step S4 is followed by step S7 which will be described later.

In this case and assuming that the user has formulated a requirement for quality zq in his request, and provided the latter is different from that in the previous request, then the step S7 is also proceeded to.

If, on the contrary, the spatial zone of the sub-image and/or the resolution have changed, then a new analysis of the request must be performed and the step S4 is followed by the step S5.

Step S5 concerns the analysis of the request and the formulation of a response to it, as regards the first aspect of the invention.

This step is broken down into the steps S51 to S57 of the algorithm of FIG. 6 which also form part of the algorithm of FIG. 5.

Step S51 involves going to the first tile $T_1$ of the image under consideration (FIG. 4e).

Step S51 leads to step S52, during which a test is carried out in order to know if the tile is concerned by the selected sub-image.

In the case of the tile T1 of FIG. 4e, the selected sub-image is not concerned and step S52 is followed by a step S53 during which the tile counter is incremented and tile T2 is now proceeded to.

The test carried out at step S52 this time enables step S54 to be proceeded to.

During step S54, the size or dimension of the sub-image projected into the different frequency sub-bands is calculated and stored in memory for the tile under consideration.

Although FIG. 4b shows the projection of the selected sub-image in the different sub-bands obtained by the decomposition of the image rather than of the tile under consideration, the principle remains applicable if a tile is considered to be an image portion.

Step S54 is broken down into the different steps E1 to E7 of the algorithm shown in FIG. 7.

This algorithm comprises a step E1 of initializing the values of the parameters zulx, zuly, zw, zh and zres corresponding to the selected sub-image.

In addition, it should be noted that it is also possible to add the coordinates zulcx (x-coordinate) and zulcy (y-coordinate) corresponding to the coordinates of the image with respect to an original frame of reference, where these coordinates do not coincide with the origin of the reference frame.

For simplicity, the case will be taken where the coordinates zulcx and zulcy coincide with the origin of the reference frame.

Step E1 is followed by a step E2, during which a parameter i is fixed as being equal to the resolution zres desired by the user for the selected sub-image.

In the case concerned here, i is equal to 3.

Step E2 is followed by a step E3, during which, during the first iteration, the size of the sub-image in the sub-band LL(3) is calculated.

During this step, zulcxLL(3), zulxLL(3), zulcyLL(3), zulyLL(3), zwLL(3) and zhLL (3) are thus calculated in the following manner:

zulcxLL(3)=zulcx and zulcyLL(3)=zulcy.

This calculation is simplified given that the terms zulcx and zulcy are equal to zero.

zulxLL(3)=E((zulx+1)/2)
zulyLL(3)=E((zuly+1)/2)
zwLL(3)=E((zulx+zw+1)/2)−zulxLL(3), where E(a) designates the mathematical function integer part of a
zhLL(3)=E((zuly+zh+1)/2)−zulyLL(3).

The calculations made during this step are only intermediate calculations whose results are stored in registers of the memory 106.

During the following step denoted E4, a test is carried out on the parameter i in order to determine whether it is equal to zero.

If so, step E4 is followed by a step E5 ending the algorithm.

If not, step E4 is followed by a step E6, during which a calculation is made of the size of the selected sub-image in the different frequency sub-bands $HL_3$, $LH_3$ and $HH_3$, taking i=3 in the following formulae:

*zulxHL(i)=E(zulx/2)* zulyHL(i)=zulyLL(i)

*zulcxHL(i)=zulcx+zwLL(i)* zulcyHL(i)=zulcy

*zwHL(i)=E((zulx+zw)/2)−zulxHL(i)* zhHL(i)=zhLL(i)

zulxLH(i)=zulxLL(i)

*zulyLH(i)=E(zuly/2)* zulcxLH(i)=zulcx

*zulcyLH(i)=zulcy+zhLL(i)* zwLH(i)=zwLL(i)

*zhLH(i)=E((zuly+zh)/2)−zulyLH(i)* zulxHH(i)=zulxHL(i)

zulyHH(i)=zulyLH(i)

zulcxHH(i)=zulcxHL(i)

zulcyHH(i)=zulcyLH(i)

zwHH(i)=zwHL(i)

zhHH(i)=zhLH(i).

Thus zulcxHL(3), zulxHL(3), zulcyHL(3), zulyHL(3), zwHL(3) and zhHL(3) are calculated, and then zulcxLH(3), zulxLH(3), zulcyLH(3), zulyLH(3), zwLH(3) and zhLH(3).

Next, the size of the sub-image in the sub-band $HH_3$ is calculated, which supplies the elements zulcxHH(3), zulxHH(3), zulcyHH(3), zulyHH(3), zwHH(3) and zhHH(3).

The different elements which have just been calculated during step E6 are transferred to the corresponding sub-bands $HL_3$, $LH_3$ and $HH_3$. These elements are furthermore stored in registers in the random access memory 106 of FIG. 3.

The following step E7 consists of updating the different elements calculated for the low sub-band $LL_3$ with a view to its new decomposition.

The updating is performed by means of the following equalities:

zulx=zulxLL(i)

zuly=zulyLL(i)

zulcx=zulcxLL(i)

zulcy=zulcyLL(i)

zw=zwLL(i)

zh=zhLL(i).

At the end of this step the parameter i is then decremented to the value 2.

At the following cycle, step E3 leads to the calculation of the size of the sub-image projected in the sub-band $LL_2$ and, during step E6, to the calculation of this same sub-image projected in the sub-bands $HL_2$, $LH_2$, $HH_2$.

These calculations are made using the formulae presented above during the calculation of the size of the sub-image in the sub-band signals $LL_3$, $LH_3$, $LH_3$ and $HH_3$.

In a similar manner, step E7 makes it possible to update the coefficients obtained during the previous calculations of the size of the sub-image projected in the sub-band signals $LL_2$, $HL_2$, $LH_2$ and $HH_2$.

The results of this step are stored in registers of the memory 106.

The parameter i is next decremented to the value 1 and step E3 once again executed makes it possible to calculate the size of the sub-image projected in the sub-band $LL_1$. During step E6, a calculation is made of the size of this same sub-image projected in the sub-bands $HL_1$, $LH_1$, $HH_1$ using the same formulae as before.

The calculations of step E6 lead by themselves to the location of the selected sub-image in the different frequency sub-band signals of the last resolution level, namely $HL_1$, $LH_1$ and $HH_1$.

The step E7 of updating the coefficients and decrementing i to 0 is followed by step E3, which makes it possible to calculate the size of the sub-image projected in the low sub-band of the last resolution level $LL_0$.

The result issuing from this step makes it possible to locate the sub-image selected in the low sub-band $LL_0$ of the image under consideration by determining its position in the latter (FIG. 4*b*).

Step E3 is then followed by step E4 and step E5 ending the algorithm.

It should be noted that the above calculations just made were for a projection of the sub-image in the tile T2 of the image under consideration. The calculation principle remains the same when the image is not divided into tiles since then the image can be considered to be a single tile (FIG. 4*b*).

The processing according to the invention carried out during steps S54, E1 to E7 on the header parameters of the encoded image signal continues with step S55 in FIG. 6.

This step S55 is broken down according to the different steps of the algorithm of FIG. 8, which form part of the algorithm of FIG. 6, just like steps E1 to E7 of the algorithm of FIG. 7.

For the tile under consideration, the algorithm of FIG. 8 depends on two loops, one inside the other, which make it possible to go through each data packet P(r,q) of the binary data stream making up the encoded image signal as a function of the parameters of resolution r and of quality q.

During the first step S551, the resolution parameter r is initialized to 0.

During the following step S552, a test is performed on the parameter r in order to determine if the resolution of the data packet under consideration is concerned by the user's request.

If so, step S552 is followed by a step S553 during which the parameter of the quality layer q is initialized to the value 0.

If not, step S552 is followed by a step S557 which will be described later.

Returning to step S553, this is followed by a step S554 during which two operations are performed.

The first operation consists of identifying the blocks of data of the packet under consideration which are concerned by the user's request.

This first operation is made by examining the data blocks which overlie the sub-image projected into the different sub-bands.

It is to be noted that this operation consists in determining a quantity of data of the selected part of the signal.

The second operation consists of adding the quantity of data attributed to each block of data previously identified.

These operations are illustrated by the following formula $S(r,q)=\Sigma_i^B L_i 1_i$, where $L_i$ designates the length of data block i and $_i$ takes the value 1 if the data block has been identified as being concerned by the request for that particular resolution and the value 0 if this code block has not been identified as such.

Note that this sum makes it possible to attribute a quantity or a volume of data for a given resolution and quality layer, relatively to a data packet P(r, q), for the tile concerned by the algorithm of FIG. 6 and for the sub-image under consideration.

More particularly, this sum corresponds to a determined quantity of information data representative of the selected part of the signal according to the present invention.

However, as indicated above, this sum is obtained from the determined quantity of data of the selected part of the signal.

Step S554 does not require any entropic decoding of the data, but just a rapid analysis of the header of the data packet under consideration in order to determine the number of bits associated with each data block under consideration.

It should be noted that systems for storing the lengths of the data blocks in memory could be implemented for avoiding having to go through the encoded image signal file again in the case where a data block is called upon several times during the course of different requests.

Step S554 is then followed by a step S555 during which a test is carried out in order to determine if the quality layer under consideration is the last layer.

If not, this step is followed by a step S556 during which a counter increments the parameter of the quality layer by one unit and the previously described step S553 is then returned to.

If it is, step S555 is followed by a step S557 during which a test is performed in order to determine if the resolution under consideration constitutes the last resolution.

If not, step S557 is followed by a step S558 during which a counter increments the resolution parameter by one unit and the previously described step S551 is returned to.

If it is, step S557 terminates the algorithm of FIG. 8.

When the algorithm of FIG. 6 has gone through all the tiles of FIG. 4e, step S55 will have enabled a quantity of information data to be determined representative of the selected sub-image of the image.

In considering all the parameters of resolution and of quality layer existing in the binary data stream, the quantity of information data which has been determined at step S55 corresponds to the entirety of the sub-image selected by the user.

For a given resolution which is requested by the user, the system can take into account either a single quality layer or all possible quality layers.

The quantity of information data determined at step S55 thus corresponds to the quantity of information data representative of the selected sub-image at the requested resolution.

During the course of the following step S56 of FIG. 6, a scale is drawn up constituted by different values indicative of quantities of information data which have been determined previously at the step S55 each of which is representative of the selected sub-image selected by the user.

Thus, for the tile concerned which has been processed during the execution of the different steps S54, S55 and S56, it is possible to determine for example, as a function of each quality layer considered and for a given resolution, the number of corresponding bits.

This number corresponds to the determined quantity of information data.

By proceeding in this manner for all the tiles concerned by the sub-image, it is possible to create the table of FIG. 9 for the tiles identified in FIG. 4e.

This table will serve as a basis for the implementation of a scale of values which in the example considered is more particularly a quality scale.

Note that the table recapitulates the number of bits to be decoded in order to reconstitute the selected sub-image at the requested resolution.

Returning to FIG. 6, step S56 is followed by a step S57 during which a test is performed in order to determine if the tile which has just been processed is the last tile.

If not, step S57 is followed by a step S53 already described.

If it is, step S57 terminates the algorithm of FIG. 6.

Returning to FIG. 5, step S5 which has just been described with reference to FIG. 6 is followed by a step S7 during which, in response to his request, the user will be supplied with at least one value indicative of a quantity of information data which has been determined during the step S5.

Thus, for example, the system can supply the user with the value indicative of the quantity of information data corresponding to the lowest quality layer on the table of FIG. 9 mentioned above, which will enable him to take a decision with respect to the request initially formulated, and possibility to refine it.

For example, if the storage capacity which the user possesses enables him to receive a quantity of data of the selected part of the signal substantially greater than that indicated by the value supplied to him, then he will be able to send out a new acquisition request. In that request there will be specified either another information data quantity value if he wishes to be sure of his choice, or the quantity of data which he will have chosen as a function of the value previously received.

This new request is processed during the step S8.

When the table of FIG. 9 has been drawn up, it is thus easy, further to a new request by the user wishing to obtain for example a better quality image, to comply with his request without further processing. Indeed, if for example the user has obtained a value corresponding to the layer of quality 0 of the table of FIG. 9 in response to his initial request, then he will be able to obtain the quantity of data of the selected part of the signal corresponding to the layer of quality 1 which has already been determined.

It is also possible to supply not an information data quantity value to the user, but a scale of these values which, following the example of the table of FIG. 9, corresponds to a quality scale.

The user receiving the quality table of FIG. 9 or else this table directly in the form of a scale of values 200 can then display it in the form which is shown by way of example in FIG. 10.

In this Figure, the different percentages each correspond to a different quality layer and thus to a different quantity of data of the selected sub-image.

It is to be noted that the values of the quantity of information data representative of the selected sub-image and which are displayed can also be the corresponding quality layers and/or the corresponding resolution.

An interactive mechanism 210 for selecting values represented on this scale is also shown.

This mechanism appears as a cursor in the form of a vertical double arrow going up and down and which, when it is selected by the user on his screen and positioned, enables a given quality value to be chosen (modification of zq at step S8 in FIG. 5) and thus a corresponding quantity of data to be received.

The selection by the mechanism 210 of a quantity of data chosen by the user will automatically generate a request addressed to the server which will then reply by providing the user (step S85) with the corresponding quantity of data of the selected sub-image.

As previously indicated in step S554 of FIG. 8, there is a correspondence between the quantity of data of the selected sub-image to provide to the user and the determined quantity of information data (length of data).

Thus, it is easy to retrieve the corresponding quantity of data from the value indicative of the determined quantity of information data chosen by the user.

This quantity of data received by the user will then be displayed on the screen as will be seen later.

Once the quantity of data chosen by the user has been provided to the user (step S85), step S9 of FIG. 5 enables decoding of that quantity of data to be performed.

This step is broken down into the steps S901 to S911 of the algorithm of FIG. 11 which also form part of the algorithm of FIG. 5.

Step S901 of the algorithm of FIG. 11 involves going to the first tile T1 of the image under consideration (FIG. 4e).

Step S901 leads to step S902 during which a test is carried out in order to know if the tile is concerned by the quantity of data held and which represents the sub-image selected by the user.

In the case of the tile T1, the sub-image is not concerned and step S902 is followed by a step S903 during which the tile counter is incremented by one unit and attention is now turned to a tile which is concerned by the quantity of data held mentioned above, such as one of the tiles T2, T3, T4, T7, T8, T9, T12, T13 and T14 of FIG. 4e.

This time the test of step S902 makes it possible to move on to step S904 during which the dimensions of the sub-images in the sub-bands which have been determined at the step S54 of FIG. 6 are read in the registers of the random-access memory 106 of FIG. 3.

Step S904 leads to a step S905 during which the data previously supplied is read and, more particularly, the data blocks of the encoded digital image signal which correspond to the quantity of data chosen by the user and corresponding to the sub-image in the tile under consideration.

Step S905 is then followed by a step S906 during which an entropic decoding or decompression of the blocks previously read is carried out and then, during a step S907, a dequantization of these decoded blocks.

To these blocks thus dequantized, the following step S908 applies a transformation which is the reverse of the decomposition into frequency sub-bands carried out on encoding.

It should be noted, for example, that this is here a reverse wavelet transformation.

At the end of step S908, part of the sub-image of the encoded image is thus reconstituted and, during step S909, a reverse color transformation may possibly be implemented on the reconstituted image part if the color image has, during its encoding, undergone a color transformation.

This step is followed by a step S910 of storing the decoded and reconstituted quantity of data held which overlies the tile under consideration.

Note that each of the steps S905 to S910 are known per se to the person skilled in the art. It should be noted that the operations S908, S909 and S910 could be combined in a single step.

During the following step S911, a test is carried out in order to know if other tiles remain to be considered.

If so, step S903 already described is proceeded to.

If not, the process is continued by step S10 of FIG. 5.

This step corresponds to displaying the quantity of data chosen by the user and which has been decoded at the previous step S9.

FIG. 12 gives a graphical example of the visualization 220 of the quantity of data which has just been decoded and which represents the sub-image selected by the user in his initial request.

Simultaneously, the quality scale 200 previously drawn up is also displayed on the screen.

Moreover, a progress bar 230 indicating the quantity of data of the selected sub-image obtained or in course of being obtained is also displayed on the scale of values 200.

Step S10 of FIG. 5 is followed by a step S11 during which the system (for example: server) sets itself to wait for a new request and then returns to the step S3 described above.

A step S12 enables the algorithm of FIG. 5 to be terminated.

With reference to the Figures which have just been mentioned the second aspect of the invention will now be described.

According to this aspect, the request received at step S2 of the algorithm of FIG. 5, of which the object is to obtain at least one quantity of data of a selected sub-image of the image, further comprises a so-called initial quantity of data defined with respect to one or more predetermined criteria.

This or these criteria represent constraints and or requirements specific to the user and for example those relating to his computer equipment.

Thus, for example, among the predetermined criteria which may be taken into account in the request, there are:
  a predetermined quantity of data;
  a fraction of the real quantity of data available in the selected sub-image (for example: 10% of the real total volume available);
  a quantity of data which is such that the time of obtaining this quantity by the user is less than a predetermined time (this will be the case for example in a client-server type architecture where the client user is distant from the server and where the transmission time of the data plays an important role for the user);
  a quantity of data corresponding to a given quality layer;
  a quantity of data corresponding to a given resolution;
  a quantity of data corresponding to the totality of the tiles which are entirely included in the selected sub-image in the case where the image signal is partitioned into tiles.

In so defining a volume or initial quantity of data in the request with respect to a predetermined criterion, the user informs the interrogated computer system of the constraints and/or particular requirements which are specific to him.

The following steps S3 and S4 of the algorithm of FIG. 5 are identical to those described previously and an analysis of the user's request is performed during the following step S5.

During this step, the procedure is as described with reference to FIG. 6 for determining the real quantity of data available in the selected sub-image. It should be noted that it is not essential in this second aspect, just as with the first aspect, to draw up a scale of values at step S56. The analysis is then proceeded with of the initial quantity of data specified in the user's request with respect to this real quantity of data available in the sub-image and thus determined.

In the hypothesis in which the initial quantity of data defined in the request with respect to a determined criterion corresponds for example to a maximum quantity of data that the user is prepared to receive, this maximum quantity will be compared to the real quantity available in the selected sub-image.

In the case where the maximum quantity is greater than the real quantity available, then an adapted quantity of data will be determined during the following step S6, shown in dotted lines in FIG. 5, in order to adapt to the user's request.

In the case cited above, this adapted quantity of data will in fact correspond to the real quantity available in the selected sub-image.

If, on the contrary, this maximum quantity is less than the real quantity available in the selected sub-image, then the server will be able to determine the quantity asked for in the request by executing the step S6.

Generally, the data indicated in the table of FIG. 9 and which have been obtained by the execution of the algorithms of FIGS. 6 and 8 are useful for performing the step S6 of determining a quantity of data adapted to the user's request.

During the following step S7, the quantity of data adapted which has just been determined is supplied to the user.

This quantity of data thus enables him to rapidly obtain a response adapted to his request, that is to say which is compatible with the predetermined criterion set in the latter.

In the same way, at the following step S8 the user may wish to modify his request and send out a new one in order to obtain (step S85) a different quantity of data to that which it has received, for example corresponding to a higher quality.

Note also that according to the second aspect of the invention, it is also possible to proceed as previously described at step S56 by drawing up a scale of values, such as a quality scale and by providing it to the user.

Indeed, this will enable the user to have more detailed information about the selected sub-image, in addition to the response adapted to his request.

Thus he will be able to obtain information about the resolutions or levels of quality available in the selected sub-image.

Apart from the differences which have just been highlighted, the preceding description given with respect to the first aspect of the invention remains the same for the second aspect.

It should be noted that according to these two aspects, the invention makes it possible to respond rapidly to a request for obtaining a sub-image selected by the user by providing a response to the user, either in the form of one or more values indicative of a determined quantity of information data representative of the sub-image and obtained from a quantity of data of the sub-image, or an adapted quantity of data itself.

In all cases, the user will benefit from a response to his request which will make it possible to easily comply with his constraints and/or requirements. This will enable him for example to avoid the drawbacks linked to the fact that he could receive a quantity of data substantially greater than the maximum storage capacity of his computer equipment.

In order to do this, he is sent for example the value indicative of this quantity of data instead of directly sending him the quantity of data itself.

It should also be noted that in applications where the user is distant from the system interrogated such as a computer server, the algorithms represented in the Figures can be stored in different locations.

However, the execution of the different algorithms will be synchronized between them.

The invention claimed is:

1. A method of processing an encoded digital signal comprising a set of data obtained by encoding according to a multi-resolution type format a set of original data representing physical quantities, and a set of parameters representing the original data and parameters used during the encoding, said method comprising the following steps:
   receiving an initial request from a sender for obtaining a selected part of the digital signal at a predetermined resolution;
   determining at least one quantity of information data representative of the selected part of the digital signal as a function of the set of parameters and of the initial request; and
   providing to the sender of the initial request at least one value indicative of the determined quantity of information data.

2. A method according to claim 1, further comprising the step of receiving a request for obtaining a value indicative of at least one other quantity of information data representative of the selected part of the digital signal.

3. A method according to claim 1, further comprising the step of drawing up a scale of different values indicative of information data quantities from the corresponding determined information data quantities, each being representative of the selected part of the digital signal.

4. A method according to claim 3, further comprising the step of providing the scale of values.

5. A method according to claim 4, further comprising the step of displaying the scale of values and an interactive mechanism for selection of values of the scale.

6. A method according to claim 4, further comprising the step of receiving a request for obtaining a quantity of data of the selected part of the signal and of which the value is indicated on the scale of values.

7. A method according to claim 4, further comprising the steps of:
   displaying the scale of values and an interactive mechanism for selection of values of the scale;
   receiving a request for obtaining a quantity of data of the selected part of the signal and of which the value is indicated on the scale of values; and
   displaying a progress bar of the quantity of data in the course of being obtained.

8. A method according to claim 4, further comprising the step of displaying the scale of values and an interactive mechanism for selection of values of the scale,
   wherein the data are arranged in the encoded digital signal in data packets P(r, q), where r and q are integers representing, respectively, a resolution and a quality layer of the packet,
   wherein each value indicative of the quantity of information data representative of the selected part of the digital signal corresponds to a given quality layer for a resolution of the part, and
   wherein the values of the scale which are displayed are the corresponding quality layers.

9. A method according to claim 4, further comprising the step of displaying the scale of values and an interactive mechanism for selection of values of the scale,
   wherein the data are arranged in the encoded digital signal in data packets P(r, q), where r and q are integers representing, respectively, a resolution and a quality layer of the packet,
   wherein each value indicative of the quantity of information data representative of the selected part of the digital signal corresponds to a given resolution for all the quality layers of the part, and
   wherein the values of the scale which are displayed are the corresponding resolutions.

10. A method according to claim 1, wherein the data are arranged in the encoded digital signal in data packets P(r, q), where r and q are integers representing, respectively, a resolution and a quality layer of the packet.

11. A method according to claim 10, each packet of data being arranged into successive blocks of data, wherein the step of determining a quantity of information data further comprises the steps of:
   identifying the data blocks concerned by the selected part; and
   determining a length of the data blocks so identified.

12. A method according to claim 11, wherein, with each data packet comprising a header, said steps of identifying and determining the length are performed on the basis of the header of the packet under consideration.

13. A method according to claim 10, wherein each value indicative of the quantity of information data representative of the selected part of the digital signal corresponds to a given quality layer for a resolution of the part.

14. A method according to claim 10, wherein each value indicative of the quantity of information data representative of the selected part of the digital signal corresponds to a given resolution for all the quality layers of the part.

15. A method according to claim 1, the set of parameters comprising parameters concerning the size of the set of original data and a resolution thereof wherein, consecutively to the step of receiving the initial request, the method further comprises the step of locating, in the set of original data, a sub-set of original data of a given size and resolution corresponding to the selected part of the digital signal, as a function of the set of parameters of size and resolution.

16. A method according to claim 1, wherein the digital signal is an image signal, the data of the image being arranged to constitute the rows and columns of the image.

17. A means which can be read by a computer or a microprocessor storing instructions of a computer program to implement the processing method according to claim 1.

18. A means which is partially or totally removable, and which can be read by a computer or a microprocessor storing instructions of a computer program to implement the processing method according to claim 1.

19. A computer program stored in a computer-readable medium which can be directly loaded into a programmable device, comprising instructions or portions of code for implementing steps of the processing method according to claim 1, when said computer program is executed on a programmable device.

20. A method of processing an encoded digital signal comprising a set of data obtained by encoding according to a multi-resolution type format a set of original data representing physical quantities, and a set of parameters representing the original data and parameters used during the encoding, the method comprising the following steps:
receiving a request from a sender for obtaining at least one initial quantity of data of a selected part of the digital signal at a predetermined resolution, the initial quantity of data being defined with respect to at least one predetermined criterion;
analyzing the initial quantity of data of the request with respect to the real quantity of data available of the selected part of the digital signal and determined from the set of parameters and from the request;
determining a quantity of data adapted as a function of the result of the analysis and of the set of parameters; and
providing the adapted quantity of data determined to the sender of the request.

21. A method according to claim 20, further comprising the step of drawing up a scale of different values indicative of information data quantities based on a step of determining corresponding information data quantities, each being representative of the selected part of the digital signal.

22. A method according to claim 21, wherein said step of determining the adapted quantity of data is also performed as a function of the values of the scale of values.

23. A method according to claim 21, further comprising the step of providing the scale of values.

24. A method according to claim 21, wherein the data are arranged in the encoded digital signal in data packets P(r, q), where r and q are integers representing, respectively, a resolution and a quality layer of the packet,
wherein each packet of data is arranged into successive blocks of data, and
wherein the step of determining a quantity of information data further comprises the steps of:
identifying the data blocks concerned by the selected part; and
determining a length of the data blocks so identified.

25. A method according to claim 24, wherein, with each data packet comprising a header, said steps of identifying and determining the length are performed on the basis of the header of the packet under consideration.

26. A method according to claim 20, wherein the predetermined criterion corresponds to a predetermined quantity of data.

27. A method according to claim 20, wherein the predetermined criterion corresponds to a fraction of the real quantity of data available in the selected part of the digital signal.

28. A method according to claim 20, wherein the initial quantity of data is such that the time of obtaining the initial quantity of data is less than a predetermined time.

29. A method according to claim 20, wherein the data are arranged in the encoded digital signal in data packets P(r, q), where r and q are integers representing, respectively, a resolution and a quality layer of the packet.

30. A means which can be read by a computer or a microprocessor storing instructions of a computer program to implement the processing method according to claim 20.

31. A means which is partially or totally removable, and which can be read by a computer or a microprocessor storing instructions of a computer program to implement the processing method according to claim 20.

32. A computer program stored in a computer-readable medium which can be directly loaded into a programmable device, comprising instructions or portions of code for implementing steps of the processing method according to claim 20, when said computer program is executed on a programmable device.

33. A device for processing an encoded digital signal comprising a set of data obtained by encoding according to a multi-resolution type format a set of original data representing physical quantities, and a set of parameters representing the original data and parameters used during the encoding, said device comprising:
means for receiving an initial request from a sender for obtaining a selected part of the digital signal at a predetermined resolution;
means for determining at least one quantity of information data representative of the selected part of the digital signal as a function of the set of parameters and of the initial request; and
means for providing to the sender of the initial request at least one value indicative of this determined quantity of information data.

34. A device according to claim 33, further comprising means for receiving a request for obtaining a value indicative of at least one other quantity of information data representative of the selected part of the digital signal.

35. A device according to claim 33, further comprising means of drawing up a scale of different values indicative of information data quantities from corresponding determined information data quantities, each being representative of the selected part of the digital signal.

36. A device according to claim 35, further comprising means for providing the scale of values.

37. A device according to claim 35, further comprising means for displaying the scale of values and an interactive mechanism for selection of values of the scale.

38. A device according to claim 35, further comprising means for receiving a request for obtaining a quantity of data of the selected part of the signal of which the value is indicated on the scale of values.

39. A device according to claim 35, further comprising:
means for displaying the scale of values and an interactive mechanism for selection of values of the scale;
means for receiving a request for obtaining a quantity of data of the selected part of the signal of which the value is indicated on the scale of values; and
means for displaying a progress bar of the quantity of data in the course of being obtained.

40. A device according to claim 33, wherein the data are arranged in the encoded digital signal in data packets P(r, q), where r and q are integers representing, respectively, a resolution and a quality layer of the packet.

41. A device according to claim 34, each packet of data being arranged into successive blocks of data, wherein said means for determining a quantity of information data further comprise:
means for identifying the data blocks concerned by the selected part; and
means for determining a length of the data blocks so identified.

42. A device according to claim 41, wherein, with each data packet comprising a header, said means for identifying and determining the length are applied to the header of the packet under consideration.

43. A device according to claim 33, the set of parameters comprising parameters concerning the size of the set of original data and a resolution thereof, wherein the device further comprises means for locating, in the set of original data, a sub-set of original data of a given size and resolution corresponding to the selected part of the digital signal, as a function of the set of parameters of size and resolution.

44. A device for processing an encoded digital signal comprising a set of data obtained by encoding according to a multi-resolution type format a set of original data representing physical quantities, and a set of parameters representing the original data and parameters used during the encoding, said device comprising:
means for receiving a request from a sender for obtaining at least one initial quantity of data of a selected part of the digital signal at a predetermined resolution, the initial quantity of data being defined with respect to at least one predetermined criterion;
means for analyzing the initial quantity of data of the request with respect to the real quantity of data available of the selected part of the digital signal and determined from the set of parameters and from the request;
means for determining a quantity of data adapted as a function of the result of the analysis and of the set of parameters; and
means for providing the adapted quantity of data determined to the sender of the request.

45. A device according to claim 44, further comprising means of drawing up a scale of different values indicative of information data quantities based on determined corresponding information data quantities, each being representative of the selected part of the digital signal.

46. A device according to claim 45, further comprising means for providing the scale of values.

47. A device according to claim 45, wherein the data are arranged in the encoded digital signal in data packets P(r, q), where r and q are integers representing, respectively, a resolution and a quality layer of the packet,
wherein each packet of data is arranged into successive blocks of data, and
wherein said means for determining a quantity of information data further comprise:
means for identifying the data blocks concerned by the selected part; and
means for determining a length of the data blocks so identified.

48. A device according to claim 47, wherein, with each data packet comprising a header, said means for identifying and determining the length are applied to the header of the packet under consideration.

49. A device according to claim 44, wherein the data are arranged in the encoded digital signal in data packets P(r, q), where r and q are integers representing, respectively, a resolution and a quality layer of the packet.

* * * * *

UNITED STATES PATENT AND TRADEMARK OFFICE
CERTIFICATE OF CORRECTION

PATENT NO. : 7,215,819 B2
APPLICATION NO. : 10/180041
DATED : May 8, 2007
INVENTOR(S) : Patrice Onno et al.

It is certified that error appears in the above-identified patent and that said Letters Patent is hereby corrected as shown below:

ON THE TITLE PAGE (75) INVENTORS:

"Fabrice Le Laennec, Cesson Sevigne (FR)" should read
--Fabrice Le Leannec, Cesson Sevigne (FR)--.

SHEET 5:

Figure 4c, "lenght L7" should read --length L7--.

SHEET 9:

Figure 6, "stucture" should read --structure--.

COLUMN 3:

Line 15, "par" should read --part--.

COLUMN 8:

Line 15, "sub-image." should read --sub-image--.

COLUMN 9:

Line 67, "invention" should read --invention.--.

COLUMN 11:

Line 61, "packets" should read --packet--.

COLUMN 15:

Line 11, "zuIxLH(3)," should read --zulxLH(3),--; and
Line 46, "$LH_3$, $LH_3$" should read --$LH_3$, $HL_3$--.

COLUMN 16:

Line 50, "and $_i$" should read --and $1_i$--.

UNITED STATES PATENT AND TRADEMARK OFFICE
CERTIFICATE OF CORRECTION

| | |
|---|---|
| PATENT NO. | : 7,215,819 B2 |
| APPLICATION NO. | : 10/180041 |
| DATED | : May 8, 2007 |
| INVENTOR(S) | : Patrice Onno et al. |

It is certified that error appears in the above-identified patent and that said Letters Patent is hereby corrected as shown below:

COLUMN 18:

Line 7, "and" should read --and the--.

COLUMN 19:

Line 33, "here" should be deleted.

COLUMN 23:

Line 9, "thereof" should read --thereof,--.

COLUMN 25:

Line 15, "claim 34," should read --claim 40,--.

Signed and Sealed this

Thirtieth Day of December, 2008

JON W. DUDAS
*Director of the United States Patent and Trademark Office*